US012236525B2

(12) United States Patent
Lal et al.

(10) Patent No.: US 12,236,525 B2
(45) Date of Patent: Feb. 25, 2025

(54) SYSTEMS AND METHODS FOR SIMULTANEOUS MULTI-LOCATION PRESENCE IN MIXED REALITY METAVERSES

(71) Applicant: Adeia Guides, Inc., San Jose, CA (US)

(72) Inventors: Dhananjay Lal, Englewood, CO (US); Cato Yang, San Jose, CA (US)

(73) Assignee: ADEIA GUIDES INC., San Jose, CA (US)

( * ) Notice: Subject to any disclaimer, the term of this patent is extended or adjusted under 35 U.S.C. 154(b) by 82 days.

(21) Appl. No.: 17/976,530

(22) Filed: Oct. 28, 2022

(65) Prior Publication Data
US 2024/0144587 A1 May 2, 2024

(51) Int. Cl.
*G06T 17/00* (2006.01)
*G06F 3/01* (2006.01)

(52) U.S. Cl.
CPC ............ *G06T 17/00* (2013.01); *G06F 3/013* (2013.01)

(58) Field of Classification Search
CPC .............................. G06T 17/00; G06T 19/006
See application file for complete search history.

(56) References Cited

U.S. PATENT DOCUMENTS

| | | | |
|---|---|---|---|
| 2011/0072367 A1* | 3/2011 | Bauer | G06F 3/04815 715/757 |
| 2016/0004314 A1 | 1/2016 | Burckard | |
| 2024/0045704 A1* | 2/2024 | Khorshid | G06F 3/011 |
| 2024/0143065 A1 | 5/2024 | Lal et al. | |

* cited by examiner

*Primary Examiner* — Shivang I Patel
(74) *Attorney, Agent, or Firm* — HALEY GUILIANO LLP

(57) ABSTRACT

Systems and methods for simultaneously being present in multiple extended reality (XR) apps running on the same XR device are disclosed. The methods concurrently run multiple XR apps on the user's XR device and use an avatar to represent the user's presence in each app. The methods determine whether the user is actively present in a first app or a second app. When the user is not actively present in a first app, activity in the first app is monitored, the avatar is configured to provide auto-responses based on AI, ML, or preprogrammed responses for relevant queries to simulate the user's presence. Notifications and summary of the activities in the first app are provided to the user while they are actively present in the second app. Instead of rendering the first app, back-end simulations of the activities in the first app are processed and made available when rendering is resumed.

24 Claims, 30 Drawing Sheets

Relevancy Determination Module 1000

| Person speaking | Person addressed | Context | Relevancy rank |
|---|---|---|---|
| John (School friend) | User | Person speaking addressing the user and asking: How was your weekend? | 3 |
| Pam (Cousin) | | | 4 |
| Anand (Boss) | | | 1 |
| Myla (Stranger) | | | 8 |

FIG. 10

Relevancy Determination Module 1100

| Person speaking | Person addressed | Query | Relevancy rank |
|---|---|---|---|
| John (Co-worker) | User (Jose) | How are you? | 7 |
| | | Where are we with the licensing report? | 3 |
| | | Are you in for lunch with the team tomorrow? | 5 |
| | | Jose will be leading the meeting today | 1 |

FIG. 11

| Game X | Relevancy Determination Module | |
|---|---|---|
| | Avatar game status | Relevancy rank |
| Avatar's game status | Final life in game about to end and needs action to survive | 1 |
| | Scoring opportunity to move to next level | 2 |
| | Minor scoring opportunity | 5 |
| | Routine action needed | 8 |

| Masking Module | | |
|---|---|---|
| Current pose | User diversion | Masking action |
| User looking at 35° to the left of an origin | User looks away 63° to the left of an origin to view a notification | Avatar continues to look 35° to the left of an origin |
| User returns to the current app and is looking 46° to the left of an origin | | Mask a transition from 35° to 46° over a threshold period to prevent/minimize choppy display transition |

FIG. 17

| Active | Inactive | Processes/Actions |
|---|---|---|
| App1 | | Active: App 1 / Render App 1<br>Inactive: Apps 2, 3, and 4<br>Action: Display avatars in Apps 2, 3, and 4 and automate avatars |
| App4 | | Active: App 4 / Render App 4<br>Inactive: Apps 1, 2, and 3<br>Actions:<br>- Remove avatar from App 4 and replace with user<br>- Replace user in App 1 with avatar and automate<br>- Display avatars in Apps 1-3 |
| App3 | | Active: App 3 / Render App 3<br>Inactive: Apps 1, 2, and 4<br>Actions:<br>- Remove avatar from App 3 and replace with user<br>- Replace user in App 4 with avatar and automate<br>- Display avatars in Apps 1, 2, and 3 |
| App4 | | Active: App 4 / Render App 4<br>Inactive: Apps 1, 2, and 3<br>Actions:<br>- Remove avatar from App 4 and replace with user<br>- Replace user in App3 with avatar and automate<br>- Display avatars in Apps 1-3<br>- Detect back and forth switching pattern between Apps 3 and 4 |

FIG. 26

| Safety module | | |
|---|---|---|
| Current App | App to be transitioned | Safety assessment | Allow/Prevent App transition |
| App 1 | App 2 | Switching from App 1 (an AR App) to App 2 (VR App) at current point in App 2 will require the user to walk 7 steps forward which will end in user colliding with a wall | Prevent transition |
| App 1 | App 4 | Switching from App 1 (an AR App) to App 3 (AR App) at current point in App4 will require the user to rotate which will end up in direct contact with a family member walking by. Since App 4 is an AR app that allows see through functionality, the user can see the obstacle and avoid it | Allow transition |
| App 3 | App 1 | Switching from App 3 to App 1 at current point in App 1 will result in user walking into their bed | (User override detected) Change from *Prevent transition* to *Allow transition* |

2810 — row 1
2820 — row 2
2830 — row 3

FIG. 28

| App # | Total score | Score during auto response | Auto Response Time/Total time | # of notifications generated | # of notifications acted upon | Type of auto response used |
|---|---|---|---|---|---|---|
| App 1 | 48 | 12 | 31/60 | 3 | 2 | AI-based response |
|  |  | 5 |  |  | 1 | Prerecorded response |
| App 2 | 33 | 16 | 40/60 | 5 | 3 | ML-based response |
| App 3 | 57 | 13 | 33/60 | 2 |  | Remote response |
|  |  | 8 |  |  |  | AI-based response |
| App 4 | 73 | 61 | 56/60 | 17 | 10 | ML-based response |
|  |  | 12 |  |  | 7 | AI-based response (w/o ML data) |

FIG. 30

SYSTEMS AND METHODS FOR SIMULTANEOUS MULTI-LOCATION PRESENCE IN MIXED REALITY METAVERSES

FIELD OF DISCLOSURE

Embodiments of the present disclosure relate to simultaneously being present in multiple mixed reality metaverses, and they specifically relate to managing avatar presence in multiple applications running simultaneously and in parallel in the metaverse.

BACKGROUND

Activities in the virtual world where a user or a group of users can interact with each other, play games, conduct meetings and attend events are on the rise. Numerous applications in the virtual and augmented reality space have been developed that allow users to wear a virtual reality headset and experience a virtual environment. One of the most downloaded virtual applications is Meta's Oculus™. All-encompassing headsets that wrap around the user's head, like Oculus, and applications built on its platform allow the user to be transported into the virtual world by displaying a virtual environment on a display of the headset. These headsets block out the outside world and display a 3D virtual world to create a virtual simulation for the user, such as riding a virtual roller coaster, doing a spacewalk on the moon, or performing a fictitious act that does not exist in the real world.

In operation, applications that support the virtual world are downloaded by a user on their headset device. The applications project virtual reality content on the display screen of the headset and provide, in some cases, a 360-degree view of a game, workspace, or a virtual environment. When the headsets are designed for augmented reality applications, they also allow the user to see through and experience both the real world and the virtual world.

The metaverse, which is a new term being used in the industry, is used to loosely describe the virtual worlds and applications mentioned above. The metaverse is not a single entity. It comprises of a set of spaces or lands that users like to visit and spend time in. Even a single space (an app) is typically comprised of a large number of sub-spaces that a user may want to visit.

The applications currently in the metaverse, or the virtual world, require a user to actively participate and engage with the activities in the app. For example, an app that involves virtual car racing may require the user to actively perform maneuvering of the car by using their game controller. As such, in order for a user to experience multiple apps in the metaverse, a user must quit an app, go back to the home screen, and enter another app if they want to go to a different metaverse space. Having to exit an app may cause the user to quit a game too early, leave a meeting halfway, or give up their place in a virtual line and have to start back over again when they reenter the same app.

Although running multiple apps that are not related to virtual reality in a device are known, running multiple apps in the metaverse that require the user's active presence and participation is not, leaving the user the only currently available choice of being actively present in one metaverse-related application at a time. As such, the users can be in one space at a given time—a space is a "virtual location" in one app. To move from one space to another, the user may quit their existing app, go to the home screen and then launch another app to enter a different social world. When users exit a first social world or app to go to a second social world or app, they are no longer present in the first social world or app.

Such restrictions have several drawbacks. As mentioned above, one of the drawbacks is that the user needs to restart from scratch each time they exit an app and may lose their score or place in line. Another drawback is that it is cumbersome for a user who likes to switch between multiple apps to have to exit the app completely and have to reenter each time. Yet another drawback is that the user experience greatly suffers, preventing the user from thoroughly experiencing a game or an event from start to end when they have time constraints and would like to experience another app in their limited schedule. Another drawback is that other users in the app may notice the user logging off the app and may engage with someone else in the app for a particular game. For example, a second user playing chess with the first user or having a wrestling match with the first user may move on to a third user when the first user exits the app, and when the first user reenters at a later time, the second user may still be engaged with the third user in the game or may have [moved on to a higher level.

As such, there is a need for a method for allowing the user to experience multiple apps in the metaverse that involve the user being present in the app simultaneously. There is also a need for a better user experience that does not require the user to exit the app each time they want to experience another app in the metaverse.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which:

FIG. 10 is an example of determining relevancy and significance of an event in an XR application based on another user addressing the avatar, in accordance with some embodiments of the disclosure;

FIG. 11 is an example of determining relevancy and significance of a query addressed to the user's avatar by another user in the XR application based on the context of the query, in accordance with some embodiments of the disclosure;

FIG. 12 is an example of determining relevancy and significance of an event in a virtual reality game, in accordance with some embodiments of the disclosure;

FIG. 17 is an example of a masking action performed by a masking module in response to a notification presented to the user, in accordance with some embodiments of the disclosure;

FIG. 26 is a detailed description of processes and actions performed when switching between multiple concurrently running XR apps in the metaverse, in accordance with some embodiments of the disclosure;

FIG. 28 are examples of scenarios for allowing or preventing transition from one XR app to another XR app based on safety reasons, in accordance with some embodiments of the disclosure;

FIG. 30 is a chart of type of auto-responses used and their outcomes, in accordance with some embodiments of the disclosure.

DETAILED DESCRIPTION

Figure 1:
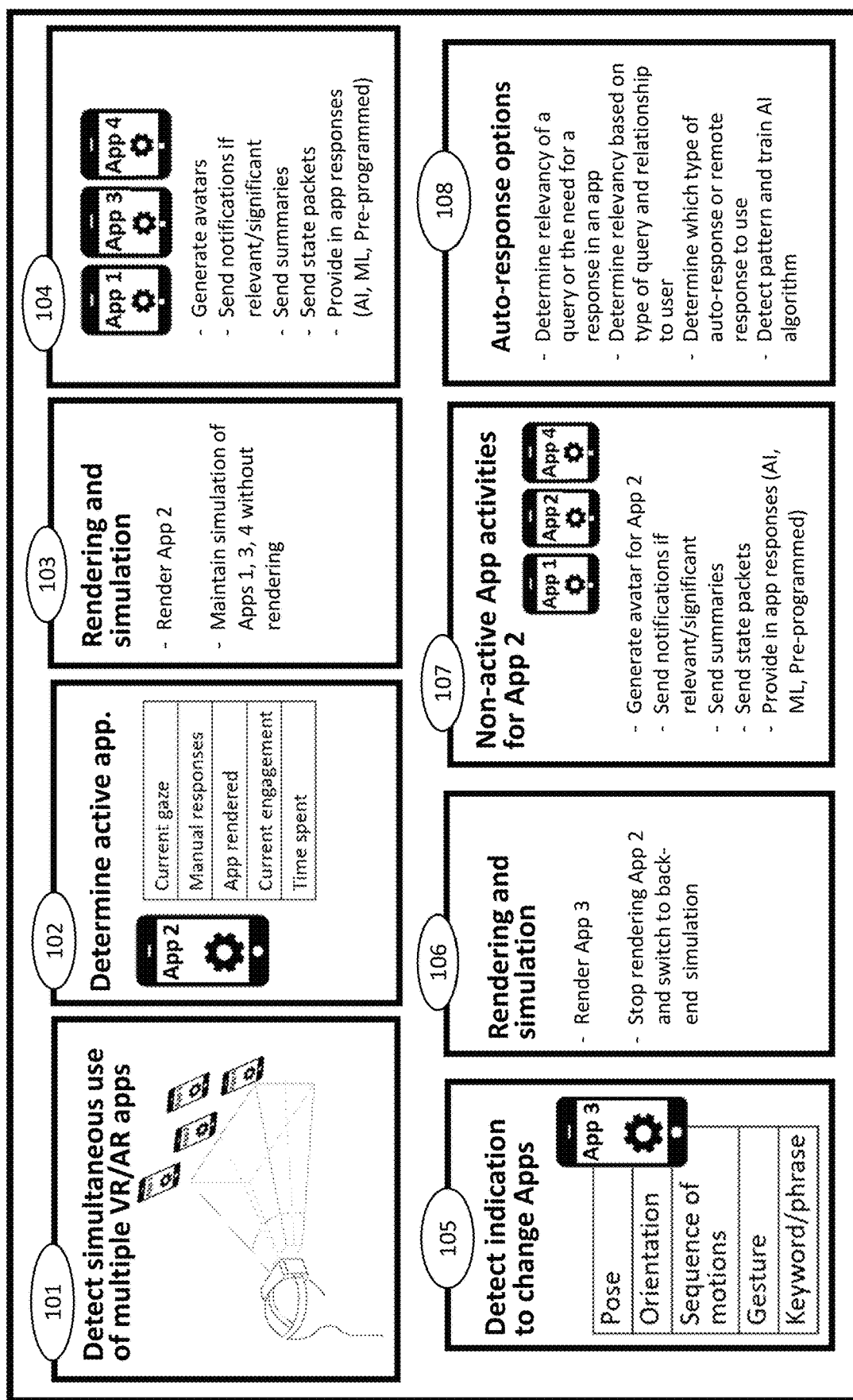
FIG. 1 is a block diagram of an example for simultaneously being present in multiple extended reality metaverses, in accordance with some embodiments of the disclosure.

In accordance with some embodiments disclosed herein, some of the above-mentioned limitations are overcome by allowing the user to concurrently run multiple apps in the virtual or metaverse space while allowing the user to simultaneously be present in each concurrently running app via an avatar. Some of the above-mentioned limitations are overcome by automatically managing avatar presence in the multiple applications running simultaneously such that auto responses may be provided by the avatars in the apps where the user is not actively present in order to simulate the user's presence.

In some embodiments, the systems and methods described herein detect those multiple applications are simultaneously being run on extended reality device. A determination is made that the user is actively present in one of the multiple applications that are simultaneously running. Upon making the determination, avatars of the user in the applications in which the user is not actively present are automated such that they may respond to any relevant events, queries, or situations that may arise in the app while the user is not actively present.

The methods and systems may determine relevancy based on a plurality of factors. These factors may include the type of app, the context of the events, queries, and situations; which user is addressing such queries to the current user; and other factors. Once a determination is made that the event, query, or situation is relevant, notifications of relevant events, queries, and situations, along with circumstances surrounding them, may be provided to the user while the user is actively present in another app. A summary of all activities from an app in which the user is not actively present may also be provided to the user.

The methods and systems may determine how to respond to an event, query, or situation via an avatar while the user is not actively present. An AI, ML, or preprogrammed response may be selected to respond to the event, query, or situation. A determination may also be made as to which type of auto-response or preprogrammed response to select based on the type and nature of the query.

In instances where a user decides to switch from one application to another, which could be as a follow-up to a notification or just because the user desires to experience another application, the user may select an option provided in the notification to jump into a particular app. In some embodiments, the user may store preprogramed motions, sequences of motions, or gestures such that they can be used as an indication to the system for switching from one app to another app. When the system detects a motion or movement that matches a preprogrammed motion, the system associates that motion with one of the several apps that are currently running and performs the switch.

In some embodiments, when the user switches from a first application in which the user is currently present to another application, e.g., the second application, rendering of the first application is stopped and back-end simulation processing is initiated. The back-end simulation processing allows the system to keep track of all activities and the current state of the first application, which may be used at a later time to re render the first application when the user decides to switch back to it. Running back-end simulation and not performing rendering of the first application while the user is not actively present also allows the system to save resources, such as CPU and GPU resources, that may be used for rendering.

FIG. 1 is a block diagram of an example for simultaneously being present in multiple extended reality metaverses, in accordance with some embodiments of the disclosure.

In some embodiments, at block 101, control circuitry of a system, or control circuitry of an extended reality device, detects use of multiple extended reality applications by a user that are running in the virtual world, such as a virtual reality or metaverse environment.

In some embodiments, the user may have two, three, or several extended reality applications running simultaneously. These applications may relate to gaming; video conferencing; group watching of media assets; being virtually present at a game, in a virtual meeting, waiting in a virtual line for something like movies, plays, or sports event tickets; or any application that has a virtual, augmented, or metaverse application. The above-mentioned events, games, conferences, etc., are herein broadly referred to as virtual or metaverse applications.

In one embodiment, the applications may be running simultaneously on an extended reality device. As used herein, the terms extended reality, metaverse, and XR, are used interchangeably to cover all instances of virtual reality, augmented reality, and mixed reality devices, applications, and environments. The extended reality (XR) device may be a headset, such as a virtual reality, augmented reality, or mixed reality headset, that is worn by a user. The XR headset may be a head-mounted XR device. It may be a device that can be worn by a user by wrapping around their head, or some portion of their head, and in some instances, it may encompass the head and the eyes of the user. It may allow the user to view both real life objects, such as a physical object in the real world, and virtual objects in the virtual or metaverse world. The XR device may also include a display that may allow the user to see objects that do not exist in the real or physical world and exist only in a virtual world. The XR device may also be a virtual, augmented, or mixed reality device that can be used for a plurality of use cases, such as for playing virtual reality games, entering a virtual reality content item, living a life in the metaverse, or playing augmented reality games that involve both the physical and virtual worlds.

In some embodiments, the XR device may be a non-headset device. For example, the XR device may be a wearable device, such as smart glasses with control circuitry, that allows the user to see through a transparent glass to view the surface. Such see-through functionality may be an optical or a video see-through functionality. In other embodiments, the XR device may be a mobile phone having a camera and a display to intake the live feed input and display it on a display screen of the mobile device. The devices mentioned may, in some embodiments, include both a front-facing or inward-facing camera and an outward-facing camera. The front-facing or inward-facing camera may be directed at the user of the device, while the outward-facing camera may capture the live images in its field of view. The devices mentioned above, such as smart glasses, mobile phones, virtual reality headsets, and the like, for the sake of simplification, are herein referred to as extended reality devices, XR devices, or extended reality headsets.

In some examples, the XR device may comprise means for eye tracking, which may be used to determine the user's gaze to determine which objects or areas, or sub areas, of a display are being gazed upon by the user when the user is viewing through the worn extended reality device. For example, if a user is gazing at a notification from another simultaneously running application, where the notification may appear in a corner of a display screen on which the user may be immersed in a VR video game, then the eye tracking may be able to determine that the gaze is focused on the notification.

The XR device may also include an inertial measuring unit (IMU), a gyroscope, an accelerometer, a camera, and sensors, such as motion sensors. Such components may be within the XR device or wirelessly connected to the XR device. These components may be used to determine the current location and orientation of the XR device. For example, if the user wearing the XR device turns their head, or their body, then the control circuitry may obtain the coordinates of the XR device from the IMU and execute an algorithm to compute the XR device's rotation from its earlier position to its current position and represent the rotation by a quaternion or rotation matrix. In some embodiments, the gyroscope located in the IMU may be used by the control circuitry to measure the angular velocity or the rotation. In this embodiment, the control circuitry may use the angular velocity at which the extended reality device has rotated to compute the current orientation. Based on the current location of the XR device, the control circuitry may determine the gaze from the headset.

At block 101, in one embodiment, the control circuitry may determine that the user currently has four XR applications running simultaneously on the XR device. These may be App 1, App 2, App 3, and App 4, as depicted in block 101.

At block 102, the control circuitry may determine that the user is currently active in App 2. The determination may be made based on one or more factors. For example, the control circuitry may look at the user's current gaze to determine which application the user is currently participating in. The control circuitry may also look at manual responses provided on a particular application, among the plurality of applications that are simultaneously running on the XR device. For example, if the user's hand movements, pose, head movements, gestures, or control module inputs correlate with steps performed in App 2, then the control circuitry may determine that the user is actively participating in App 2. In the example of control module, if the inputs by the user's hand are pressing to make a left and the on-screen correlation is a car turning left, then the control circuitry may determine based on the manual movements that the user is actively participating in App 2. Likewise, which app is rendered on the display screen, current engagement by the user, and time spent are some, among several, factors that can be used as an indication that the user is actively participating in the app, such as App 2.

At block 103, upon determining that the user is currently actively present and participating in App 2 and that the user is simultaneously running a total of four apps on the XR device, the control circuitry may continue rendering App 2 on the XR device or start rendering App 2, if not already being rendered. The control circuitry 220 and/or 228 (FIG. 2) may start (or continue if already started) maintaining a simulation of those apps in which the user is not actively present or participating. The simulations allow the control circuitry 220 and/or 228 to maintain current status in the apps without having to render them onto a display of the XR device. As such, resources such as CPU and GPU are saved since they are not utilized to render and display apps in which the user is not actively present or participating. Maintaining a current status includes determining what events are occurring in the app, what the activities are that are performed by all the users, what environment is being presented, current scores of players, current poses of users, the current user's orientation and pose, etc. The information that is to be maintained can be predetermined by the system or provided in user settings. The simulations may be maintained by way of back-end processing such that only the data portion of the simulation is processed and no graphical rendering is performed. However, adequate information relating to the graphics may be collected such that once a determination is made to turn on the rendering, the control circuitry may pick up in the app seamlessly without any breaks or glitches. For example, if the simulation data processed in real time indicates that a car is driving through a street and should be at a particular point, if the rendering is turned on, the car would continue driving from that point as if there were not frame delay or lag in the imagery and the data processing.

At block 104, in addition to rendering the active app and running back-end processing of the simulation of the apps in which the user is not actively present, the control circuitry 220 and/or 228 generates an avatar in the apps in which the user is not actively present. The avatar represents the user, and it is automatically operated to give the impression to other users of the app that the user is actively present in the app, even though, in reality, the user is actively present in another app. For example, as depicted in blocks 102 and 104, the app in which the user is actively present is App 2, and apps in which the user is not actively present are Apps 1, 3, and 4. In this embodiment, the control circuitry generates an avatar of the user in Apps 1, 3, and 4 such that other users in those apps cannot distinguish between the avatar being automatically operated or operated by the user who may be actively present and manually operating the avatar.

With respect to apps in which the user is not actively present and the avatars may be automatically operated, the control circuitry 220 and/or 228 may perform functions such as sending notifications; sending summaries; sending state packets to the system, server, and/or user; or providing in-app responses as needed by using any one or a combination of artificial intelligence (AI), machine learning (ML), prerecorded user responses, or responses remotely provided by the user.

For example, control circuitry 220 and/or 228 may send notifications when a determination is made that a query to the user or the occurrence of an event in an app in which the user is not currently present requires a response by the user. As such, since the user is not currently present in the app, the control circuitry 220 and/or 228 may send a notification to the user informing the user of the type of query or response needed to address an ongoing event in the app. In other embodiments, the control circuitry may simply send a notification to alert the user of relevant or significant steps or events occurring in one of the apps in which the user is not present such that the user is informed. If the user chooses to do so, upon receiving the notification, the user may switch from an app in which they are currently present to an app from which a notification is received.

To keep the user informed of the events occurring in an app in which the user is not actively present, the control circuitry 220 and/or 228 may sending a summary of relevant events. For example, the control circuitry may send a summary of relevant events in the app that occurred during a past predetermined period of time. If it's a gaming app, relevant events may include the score of all users, or the lives lost. If it's a meeting, the summary may include items presented by other users. Relevancy may be app- or context-dependent, and it may also be dependent upon which users are involved. The summary may be a short, long, or a customized summary as preferred by the user. Additional detail relating to the summary is provided in the discussion relating to FIG. 16.

For all the concurrently running apps in which the user is not currently present in the app, the control circuitry 220 and/or 228 may also send state packets. These state packets may be sent to a system, a server, or a user. The state packets may indicate the current state of events in each app such that the information can be used by the system, the server, or the user as needed. For example, the system or the server may use these state packets to plan CPU and GPU utilization on an upcoming switch in rendering from one app to another. The system or the server may also use these state packets to stay up to date in real time on the simulation in each app such that when a time comes to switch to actively being present in any one of the apps in which the user was previously inactively present, the system or server would have the information needed to seamlessly switch from back-end simulation processing to rendering the app without a frame delay or lag.

Although a few functions performed by the control circuitry and automatically operating the avatars when the user is not actively present are described above, the embodiments are not so limited and the control circuitry may perform other functions, such as at least those functions described in the descriptions related to FIGS. 5, 6, 8, 9, 13, 16, 18, and 19.

At block 105, the control circuitry 220 and/or 228 may receive an indication that a user intends to switch from the app that is currently being rendered in which the user is actively present to an app in which an avatar was being used and automated to represent the user as if the user were actually present in the app. The indication to switch may be received based on a movement of the user's headset, a change in the user's pose, a change in the user's orientation, a sequence of motions performed by the user that are associated with an interest to change to another app, a type of gesture performed by the user, or a keyword or phrase uttered by the user. These and other app-changing indicators may be predetermined by the user and saved in the user's profile. When the system receives such an indication, the system may match the indication with the user-stored profile to determine whether the indication can be associated with switching to another app or is simply a motion being performed by the user in their current app. For example, a user turning their head to the left may be a motion performed by the user while playing a game in an app in which they are present and not a motion indicating to the system that they wish to switch from being present in the current app to another app. On the other hand, the user may have indicated a sequence of motions in the user profile, such as turning their head to the left at a particular pace while at the same time raising their right hand, to be associated with their desire to switch from the current app to a specific app in which the user intends to be present and participate actively. Any other type of indication, such as a motion, pose, gesture, sequence of steps, or other motions may also be preprogramed by the user for each app that is being simultaneously run on the XR device such that when such indication is received, the system automatically switches from the current app to one of the plurality of apps that may be associated with such indication.

In one embodiment, as depicted in block 105, the user's indication may lead to the user switching from currently being present in App 2 to currently being present in App 3. Upon such a switch, the control circuitry at block 106 may switch from rendering App 2 to rendering App 3. The control circuitry 220 and/or 228 may also start maintaining a simulation of App 2 and may generate an avatar in App 2 to represent the user while the user is away and actively present in App 3.

At block 107, similar to steps performed at block 104, the control circuitry 220 and/or 228 may send notifications, summaries, state packets, and provide in-app auto-responses to relevant queries and events in App 2 now that the user is no longer present and actively participating in App 2.

At block 108, if a user continues to switch between the same two apps for a threshold number of times, then the control circuitry may determine a pattern and use previously provided responses deduced from such pattern to train an AI algorithm such that the accuracy of the auto-responses may be improved.

Figure 2:
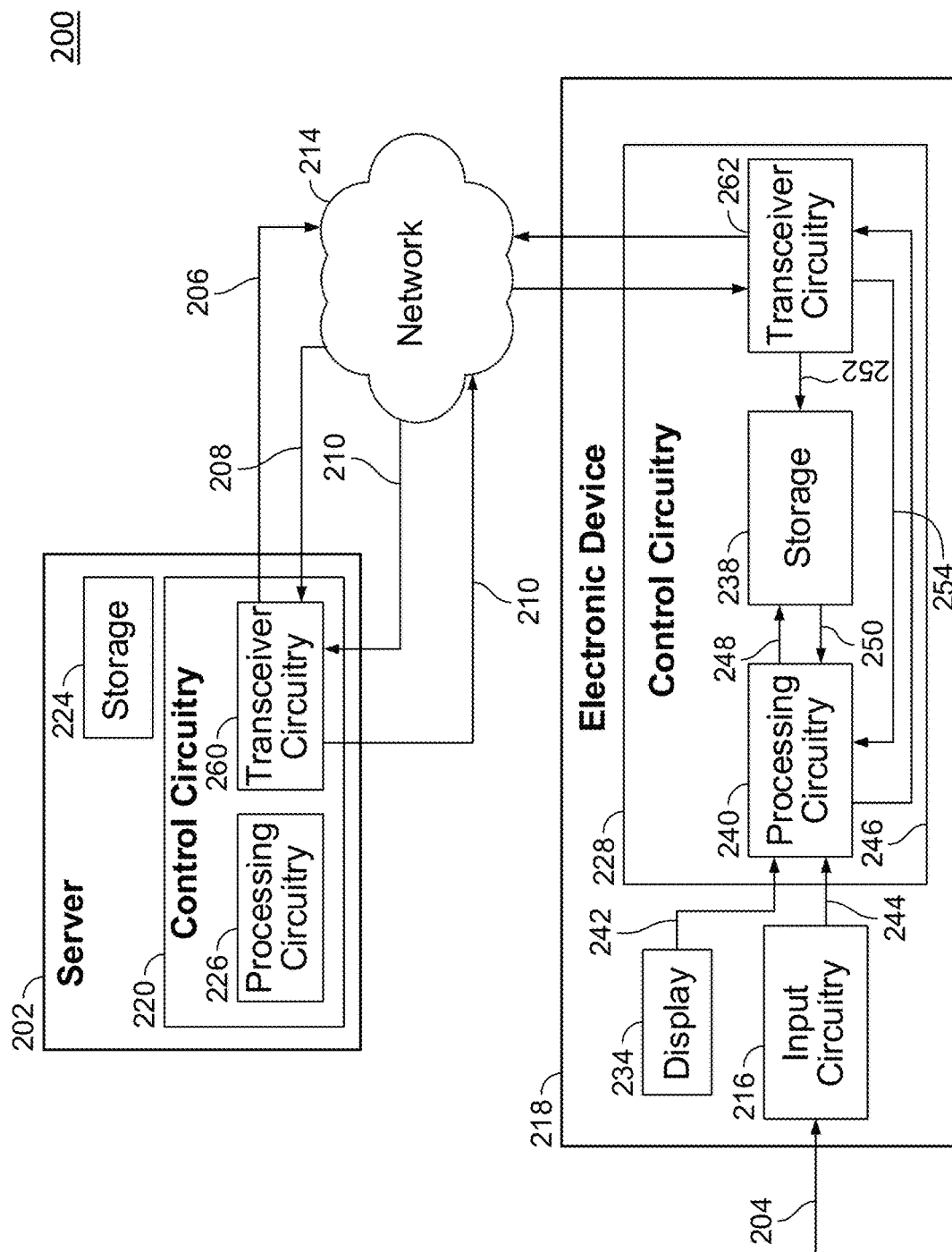
FIG. 2 is a block diagram of an example system for simultaneously being present in multiple extended reality metaverses, in accordance with some embodiments of the disclosure.
Figure 3:
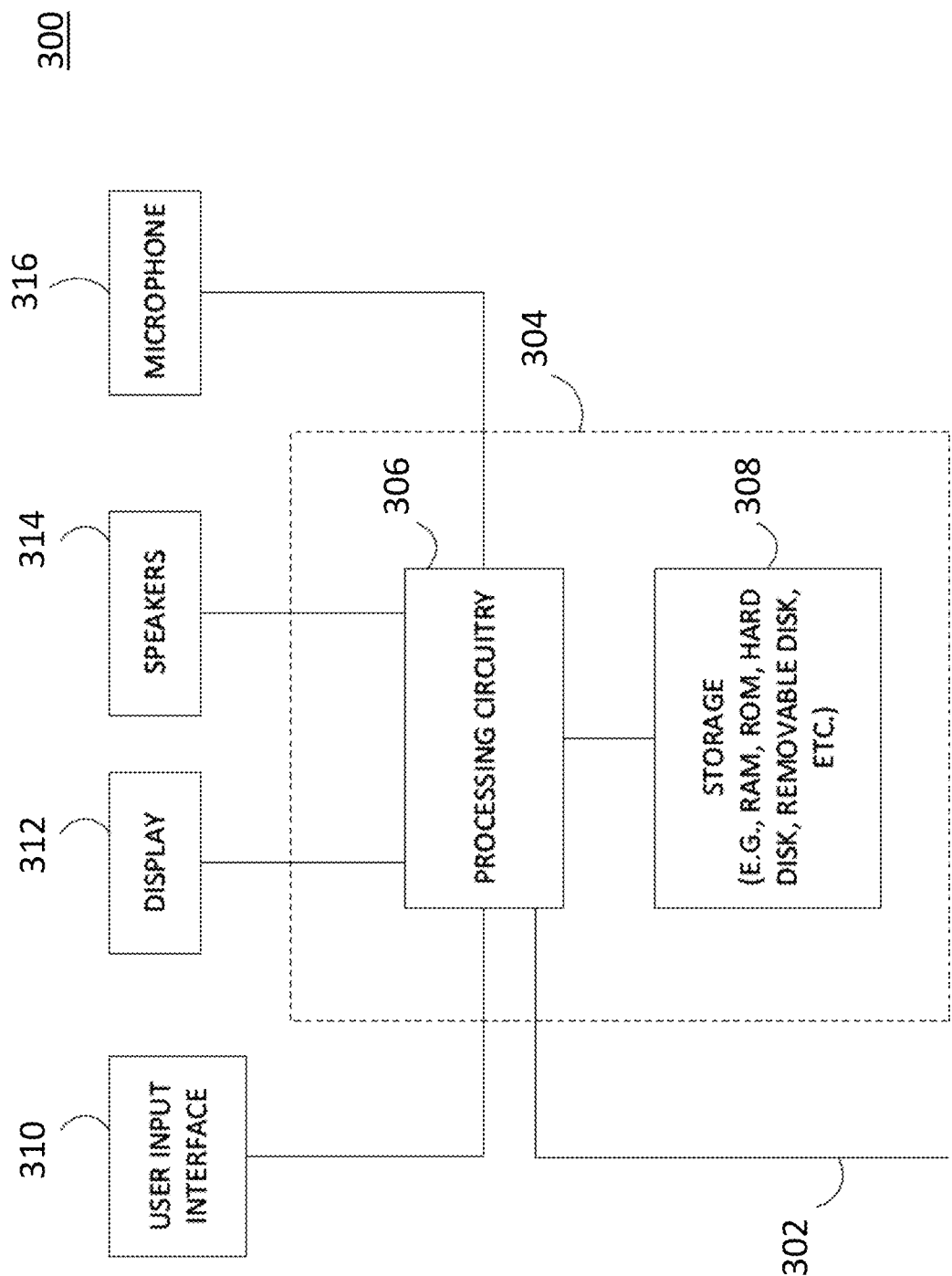
FIG. 3 is a block diagram of an extended reality device for simultaneously being present in multiple extended reality metaverses, in accordance with some embodiments of the disclosure.

FIG. 2 is a block diagram of an example system for simultaneously being present in multiple extended reality metaverses, in accordance with some embodiments of the disclosure and FIG. 3 is a block diagram of an extended reality device for simultaneously being present in multiple extended reality metaverses, in accordance with some embodiments of the disclosure.

FIGS. 2 and 3 also describe example devices, systems, servers, and related hardware that may be used to implement processes, functions, and functionalities described at least in relation to FIGS. 1, 4-30. Further, FIGS. 2 and 3 may also be used for a variety of purposes, such as: determining a user's active presence in an app, the user's gaze, generating and managing avatars in multiple apps that are concurrently running, rendering the app and its contents if the user is actively present in the app, processing simulations of the app when the app is not rendered on a device or when the user is not actively present in the app, determining relevancy and significance of an event, query, or situation in an app in which the user is not actively present, sending a notification to the user that is present in another app if the event, query, or situation in another app is relevant, sending state packets to the server or system, performing masking actions in the app to mask user distractions or when the user is reviewing notifications, generating summary of activities in an app in which the user is not actively present, providing auto-response via the avatar to relevant events, queries, or situations in an app in which the user is not actively present, determining which of the AI, ML, preprogrammed or remote responses to use or execute via the avatar, determining an indication to switch from one app to another app, distinguishing the indication to switch from an activity to be performed in the app, multiplexing between apps during the switch to stop rendering and initiate back-end simulation processing or vice versa, detecting a switching patter between two apps, and determining safety concerns in evaluating whether to allow the switch to another app when requested and performing functions related to all other processes and features described herein.

In some embodiments, one or more parts of, or the entirety of system 200, may be configured as a system implementing various features, processes, functionalities and components of FIG. 1, and 4-30. Although FIG. 2 shows a certain number of components, in various examples, system 200 may include fewer than the illustrated number of components and/or multiples of one or more of the illustrated number of components.

System 200 is shown to include a computing device 218, a server 202 and a communication network 214. It is understood that while a single instance of a component may be shown and described relative to FIG. 2, additional instances of the component may be employed. For example, server 202 may include, or may be incorporated in, more than one server. Similarly, communication network 214 may include, or may be incorporated in, more than one communication network. Server 202 is shown communicatively coupled to computing device 218 through communication network 214. While not shown in FIG. 2, server 202 may be directly communicatively coupled to computing device 218, for example, in a system absent or bypassing communication network 214.

Communication network 214 may comprise one or more network systems, such as, without limitation, an internet, LAN, WIFI or other network systems suitable for audio processing applications. In some embodiments, system 200 excludes server 202, and functionality that would otherwise be implemented by server 202 is instead implemented by other components of system 200, such as one or more components of communication network 214. In still other embodiments, server 202 works in conjunction with one or more components of communication network 214 to implement certain functionality described herein in a distributed or cooperative manner. Similarly, in some embodiments, system 200 excludes computing device 218, and functionality that would otherwise be implemented by computing device 218 is instead implemented by other components of system 200, such as one or more components of communication network 214 or server 202 or a combination. In still other embodiments, computing device 218 works in conjunction with one or more components of communication network 214 or server 202 to implement certain functionality described herein in a distributed or cooperative manner.

Computing device 218 includes control circuitry 228, display 234 and input circuitry 216. Control circuitry 228 in turn includes transceiver circuitry 262, storage 238 and processing circuitry 240. In some embodiments, computing device 218 or control circuitry 228 may be configured as electronic device 300 of FIG. 3.

Server 202 includes control circuitry 220 and storage 224. Each of storages 224 and 238 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 224, 238 may be used to store various types of content, metadata, and or other types of data (e.g., they can be used to store avatars, user's preprogrammed responses for the avatars, back-end simulations of an app, state packets, notifications, summaries, app switching indications, such as poses, motions, or sequence of motions to determine which app to switch to, switching patters, historical responses by the user, user environment details, including those details that concern user safety, and AI and ML algorithms). Non-volatile memory may also be used (e.g., to launch a boot-up routine, launch an app, render an app, and other instructions). Cloud-based storage may be used to supplement storages 224, 238 or instead of storages 224, 238. In some embodiments, data relating to avatars, user's preprogrammed responses for the avatars, back-end simulations of an app, state packets, notifications, summaries, app switching indications, such as poses, motions, or sequence of motions to determine which app to switch to, switching patters, historical responses by the user, user environment details, including those details that concern user safety, and AI and ML algorithms, and data relating to all other processes and features described herein, may be recorded and stored in one or more of storages 212, 238.

In some embodiments, control circuitry 220 and/or 228 executes instructions for an application stored in memory (e.g., storage 224 and/or storage 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 218, and a server application resides on server 202.

The application may be implemented using any suitable architecture. For example, it may be a stand-alone application wholly implemented on computing device 218. In such an approach, instructions for the application are stored locally (e.g., in storage 238), and data for use by the application is downloaded on a periodic basis (e.g., from an out-of-band feed, from an internet resource, or using another suitable approach). Control circuitry 228 may retrieve instructions for the application from storage 238 and process the instructions to perform the functionality described herein. Based on the processed instructions, control circuitry 228 may determine a type of action to perform in response to input received from input circuitry 216 or from communication network 214. For example, in response to identifying that a user has interacted with and manipulated the 3D object as instructed, the control circuitry 228 may perform the steps of processes described in FIGS. 1, and 4-14, including revealing an occluded feature of the 3D virtual object and providing access to requested data, and also perform all the steps and processes described in all the figures depicted herein.

In client/server-based embodiments, control circuitry 228 may include communication circuitry suitable for communicating with an application server (e.g., server 202) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 214). In another example of a client/server-based application, control circuitry 228 runs a web browser that interprets web pages provided by a remote server (e.g., server 202). For example, the remote server may store the instructions for the application in a storage device. The remote server may process the stored instructions using circuitry (e.g., control circuitry 228) and/or generate displays. Computing device 218 may receive the displays generated by the remote server and may display the content of the displays locally via display 234. This way, the processing of the instructions is performed remotely (e.g., by server 202) while the resulting displays, such as the display windows described elsewhere herein, are provided locally on computing device 218. Computing device 218 may receive inputs from the user via input circuitry 216 and transmit those inputs to the remote server for processing and generating the corresponding displays. Alternatively, computing device 218 may receive inputs from the user via input circuitry 216 and process and display the received inputs locally, by control circuitry 228 and display 234, respectively.

Server 202 and computing device 218 may transmit and receive content and data such as activities performed in an app while the user is present in another app, auto-responses provided by avatars, scores in an app, and input from primary devices and secondary devices, such as AR devices. Control circuitry 220, 228 may send and receive commands, requests, and other suitable data through communication network 214 using transceiver circuitry 260, 262, respectively. Control circuitry 220, 228 may communicate directly with each other using transceiver circuits 260, 262, respectively, avoiding communication network 214.

It is understood that computing device 218 is not limited to the embodiments and methods shown and described herein. In nonlimiting examples, computing device 218 may be a primary device, a personal computer (PC), a laptop computer, a tablet computer, a WebTV box, a personal computer television (PC/TV), a PC media server, a PC media center, a handheld computer, a mobile telephone, a smartphone, a virtual, augmented, or mixed reality device, or a device that can perform function in the metaverse, or any other device, computing equipment, or wireless device, and/or combination of the same capable of suitably displaying primary content and secondary content.

Control circuitry 220 and/or 218 may be based on any suitable processing circuitry such as processing circuitry 226 and/or 240, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 218 are configured for: determining a user's active presence in an app; the user's gaze; generating and managing avatars in multiple apps that are concurrently running; rendering the app and its contents if the user is actively present in the app; processing simulations of the app when the app is not rendered on a device or when the user is not actively present in the app; determining relevancy and significance of an event, query, or situation in an app in which the user is not actively present; sending a notification to the user that is present in another app if the event, query, or situation in another app is relevant; sending state packets to the server or system; performing masking actions in the app to mask user distractions or when the user is reviewing notifications; generating summary of activities in an app in which the user is not actively present; providing auto-response via the avatar to relevant events, queries, or situations in an app in which the user is not actively present; determining which of the AI, ML, preprogrammed or remote responses to use or execute via the avatar; determining an indication to switch from one app to another app; distinguishing the indication to switch from an activity to be performed in the app; multiplexing between apps during the switch to stop rendering and initiate back-end simulation processing or vice versa; detecting a switching patter between two apps; and determining safety concerns in evaluating whether to allow the switch to another app when requested and perform functions related to all other processes; and features described herein, including those described and shown in connection with FIGS. 1 and 4-30.

Computing device 218 receives a user input 204 at input circuitry 216. For example, computing device 218 may receive a user input like motions performed by the user while in an app, movements of the XR headset, a pose or motion to indicate switch from a current app in which the user is present to another app.

Transmission of user input 204 to computing device 218 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 216 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 240 may receive input 204 from input circuit 216. Processing circuitry 240 may convert or translate the received user input 204 that may be in the form of voice input into a microphone, or movement or gestures to digital signals. In some embodiments, input circuit 216 performs the translation to digital signals. In some embodiments, processing circuitry 240 (or processing circuitry 226, as the case may be) carries out disclosed processes and methods. For example, processing circuitry 240 or processing circuitry 226 may perform processes as described in FIGS. 1 and 4-30, respectively.

FIG. 3 is a block diagram of an extended reality device for simultaneously being present in multiple extended reality metaverses, in accordance with some embodiments of the disclosure. In an embodiment, the equipment device 300, is the same equipment device 202 of FIG. 2. The equipment device 300 may receive content and data via input/output (I/O) path 302. The I/O path 302 may provide audio content (e.g., such as in the speakers of an XR headset). The control circuitry 304 may be used to send and receive commands, requests, and other suitable data using the I/O path 302. The I/O path 302 may connect the control circuitry 304 (and specifically the processing circuitry 306) to one or more communications paths. I/O functions may be provided by one or more of these communications paths but are shown as a single path in FIG. 3 to avoid overcomplicating the drawing.

The control circuitry 304 may be based on any suitable processing circuitry such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 304 may include communications circuitry suitable for allowing communications between two separate user devices to perform the functions of determining a user's active presence in an app, the user's gaze, generating and managing avatars in multiple apps that are concurrently running, rendering the app and its contents if the user is actively present in the app, processing simulations of the app when the app is not rendered on a device or when the user is not actively present in the app, determining relevancy and significance of an event, query, or situation in an app in which the user is not actively present, sending a notification to the user that is present in another app if the event, query, or situation in another app is relevant, sending state packets to the server or system, performing masking actions in the app to mask user distractions or when the user is reviewing notifications, generating summary of activities in an app in which the user is not actively present, providing auto-response via the avatar to relevant events, queries, or situations in an app in which the user is not actively present, determining which of the AI, ML, preprogrammed or remote responses to use or perform via the avatar, determining an indication to switch from one app to another app, distinguishing the indication to switch from an activity to be performed in the app, multiplexing between apps during the switch to stop rendering and initiate back-end simulation processing or vice versa, detecting a switching patter between two apps, and determining safety concerns in evaluating whether to allow the switch to another app when requested and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 308 may be used to store avatars, user's preprogrammed responses for the avatars, back-end simulations of an app, state packets, notifications, summaries, app switching indications, such as poses, motions, or sequence of motions to determine which app to switch to, switching patters, historical responses by the user, user environment details, including those details that concern user safety, and AI and ML algorithms and all the functionalities and processes discussed herein. Cloud-based storage, described in relation to FIG. 3, may be used to supplement the storage 308 or instead of the storage 308.

The control circuitry 304 may include audio generating circuitry and tuning circuitry, such as one or more analog tuners, audio generation circuitry, filters or any other suitable tuning or audio circuits or combinations of such circuits. The control circuitry 304 may also include scaler circuitry for upconverting and down converting content into the preferred output format of the electronic device 300. The control circuitry 304 may also include digital-to-analog converter circuitry and analog-to-digital converter circuitry for converting between digital and analog signals. The tuning and encoding circuitry may be used by the electronic device 300 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 308 is provided as a separate device from the electronic device 300, the tuning and encoding circuitry (including multiple tuners) may be associated with the storage 308.

The user may utter instructions to the control circuitry 304, which are received by the microphone 316. The microphone 316 may be any microphone (or microphones) capable of detecting human speech. The microphone 316 is connected to the processing circuitry 306 to transmit detected voice commands and other speech thereto for processing. In some embodiments, voice assistants (e.g., Siri, Alexa, Google Home and similar such voice assistants) receive and process the voice commands and other speech.

The electronic device 300 may include an interface 310. The interface 310 may be any suitable user interface, such as a remote control, mouse, trackball, keypad, keyboard, touch screen, touchpad, stylus input, joystick, or other user input interfaces. A display 312 may be provided as a stand-alone device or integrated with other elements of the electronic device 300. For example, the display 312 may be a touchscreen or touch-sensitive display. In such circumstances, the interface 310 may be integrated with or combined with the microphone 316. When the interface 310 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 310 may be HDTV-capable. In some embodiments, the display 312 may be a 3D display. The speaker (or speakers) 314 may be provided as integrated with other elements of electronic device 300 or may be a stand-alone unit. In some embodiments, the display 312 may be outputted through speaker 314.

The equipment device 300 of FIG. 3 can be implemented in system 200 of FIG. 2 as primary equipment device 202, but any other type of user equipment suitable for allowing communications between two separate user devices for performing the functions related to implementing machine learning (ML) and artificial intelligence (AI) algorithms, and all the functionalities discussed associated with the figures mentioned in this application.

Figure 4:
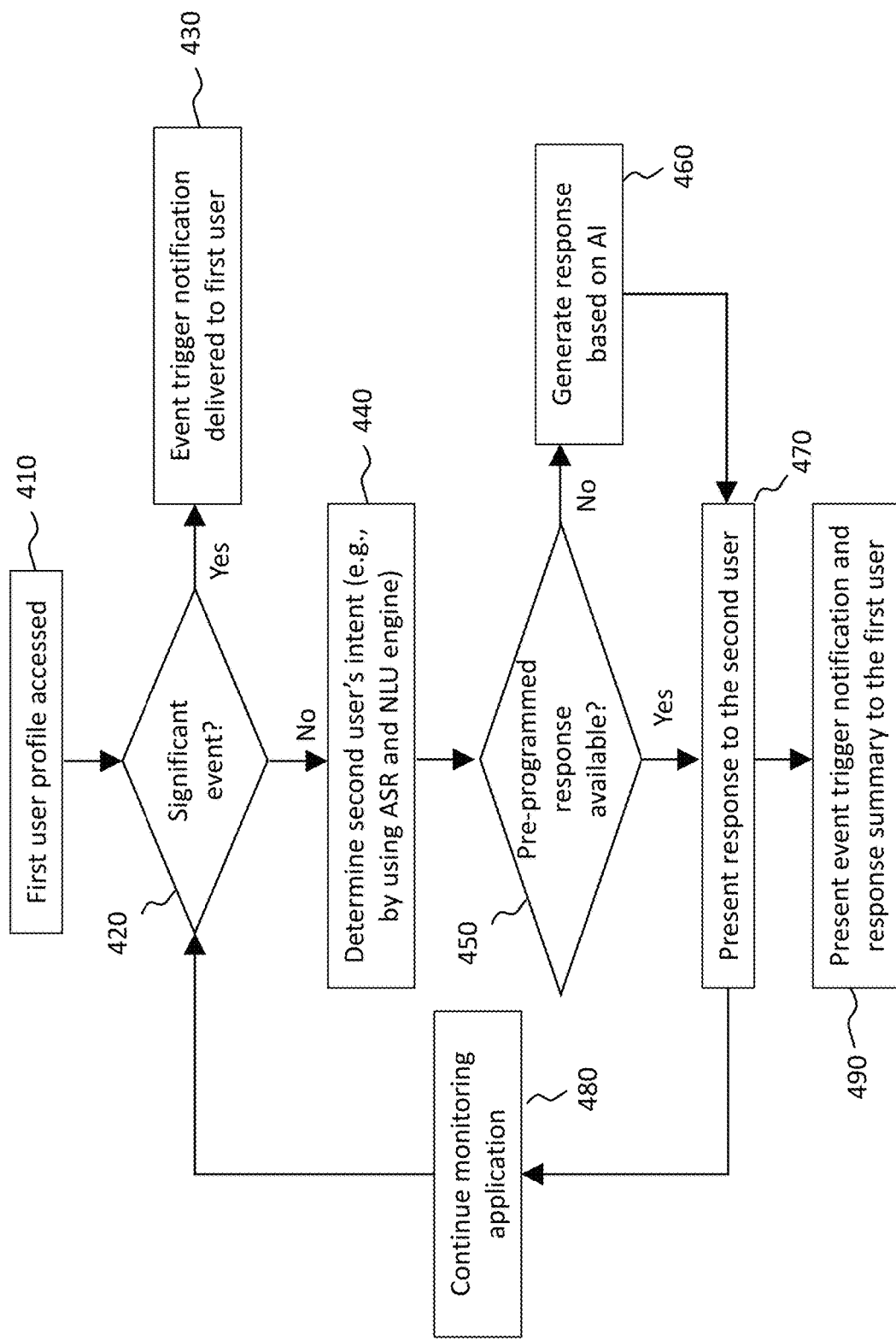
FIG. 4 is a flowchart of a process for providing a response via an avatar in an app in which the user is not present, in accordance with some embodiments of the disclosure.

FIG. 4 is a flowchart of a process for providing a response via an avatar in an app in which the user is not present, in accordance with some embodiments of the disclosure. In one embodiment, the process described in connection with FIG. 4 is used to determine the relevancy and significance of an event that occurs in an XR app in which the user is not present. If the event is determined to be significant, then the system, via its control circuitry, performs a series of steps for responding to the event, via an avatar in the XR app, either by using a user's preprogrammed response or by using an AI algorithm. Providing such a response, whether it's preprogrammed or based on an AI algorithm, allows a user to artificially simulate their presence in the XR app when the user is in fact not actively present in the app and is present in another app that is concurrently running. The actions and responses by an avatar in such a simulated presence are performed in a way, such as by providing auto- or preprogrammed responses, that other users cannot distinguish between whether the user is actually present via the avatar or if the avatar is on autopilot, i.e., automated.

The process begins, in one embodiment, at block 410. The user may populate their user profile with preprogrammed voices, preprogramed responses to standard queries, responses to standard queries or gestures towards the user's avatar, and a plurality of other verbal and nonverbal responses that may be used when an appropriate event occurs in the XR app.

For example, a user may have a free program response of "I had a great weekend; we went to the beach with the family," and "I am doing well," that may be used if another user in the XR app in which the user is not present queries the user about their weekend or how the user is doing. The appropriate preprogrammed response may be selected from several preprogrammed responses store in the user's profile based on keywords of the query. For example, if another user asks the current user, "How was your weekend?" then the system may look at the keyword "weekend" or the context of the query overall and select the preprogrammed response "I had a great weekend; we went to the beach with the family." The preprogrammed response may then be uttered by the avatar using the user's recorded voice.

At block 420, the control circuitry 220 and/or 228, as depicted in FIG. 2, may determine whether an event is a significant event. What is significant may vary based on the type of XR application used. What is significant may also vary based on the context of the query. Furthermore, what is significant may also be based on which user is querying the user. For example, two other users discussing their weekend plans may not be significant to the current user and may not require the current user to respond to the discussion. However, one of the users turning to the current user and asking them directly how the user's weekend was may rise to the level of significance for which a user may want to respond. In another example, a general query in a virtual meeting, which may be part of an XR app concurrently running on the user's XR device, where the person querying happens to be the user's boss, may be determined to be significant and the user may want to respond via their avatar to show that they are actively present in the XR application. Some additional examples of relevancy and significance are provided in FIGS. 8-12.

At block 430, if a determination is made that the event is significant, then the control circuitry 220 and/or 228 delivers a notification to the user, i.e., referred to in this figure as the first user. The notification may be presented on a display screen of the first user's XR device. The user may choose to simply read the notification and ignore the notification, or act upon the notification and switch to the XR pp for which the notification was sent.

If a determination is made at block 420 that the event is not significant, then, at block 440, the control circuitry 220 and/or 228 may further analyze the event to determine the second user's intent. It may do so by using and automatic speech recognition (ASR) and/or natural language understanding (NLU) engines.

If a determination is made, based on the further analysis, that a response is warranted then, at block 450, the control circuitry 220 and/or 228 may determine if a preprogrammed response is available. The control circuitry 220 and/or 228 may try to match an appropriate preprogrammed response, from a plurality of responses stored in the user's profile, to the significant event. Appropriateness may be a determination of whether the preprogrammed response accurately answers the second user's query directed at the first user. For example, if the second user asks the first user, "Do you have the results of the thermal analysis?" and the user has not provided a preprogrammed response that accurately responds to that question, then the control circuitry 220 and/or 228 may determine that a preprogrammed response is not available.

At block 460, in response to determining that a preprogrammed response is available, the control circuitry 220 and/or 228 may invoke an AI engine to execute an AI algorithm for answering the query directed at the user's avatar. Accordingly, a response may be generated and presented to the second user at block 470.

The control circuitry 220 and/or 228 may then continue to monitor for subsequent actions on the XR applications at block 480 and repeat the steps 420-470. At block 490, the control circuitry 220 and/or 228 may send an event trigger notification to the user and may also send a summary of the query and the response provided to the second user, such that the user is kept aware of the events that occur in the XR app while the user is actively present in another app.

Figure 5:
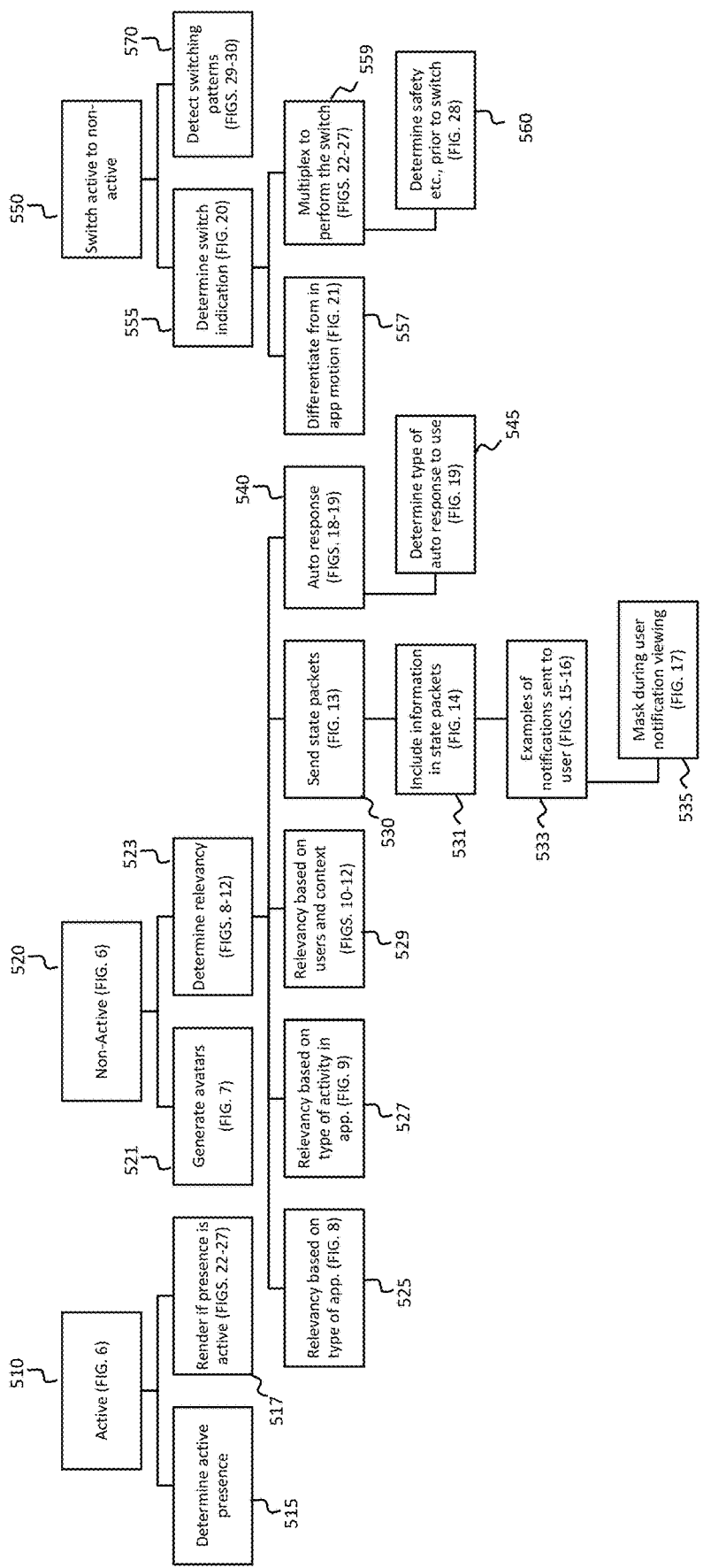
FIG. 5 is a flowchart of an overall process for simultaneously being present in multiple extended reality metaverses that are running concurrently, in accordance with some embodiments of the disclosure.
Figure 6:
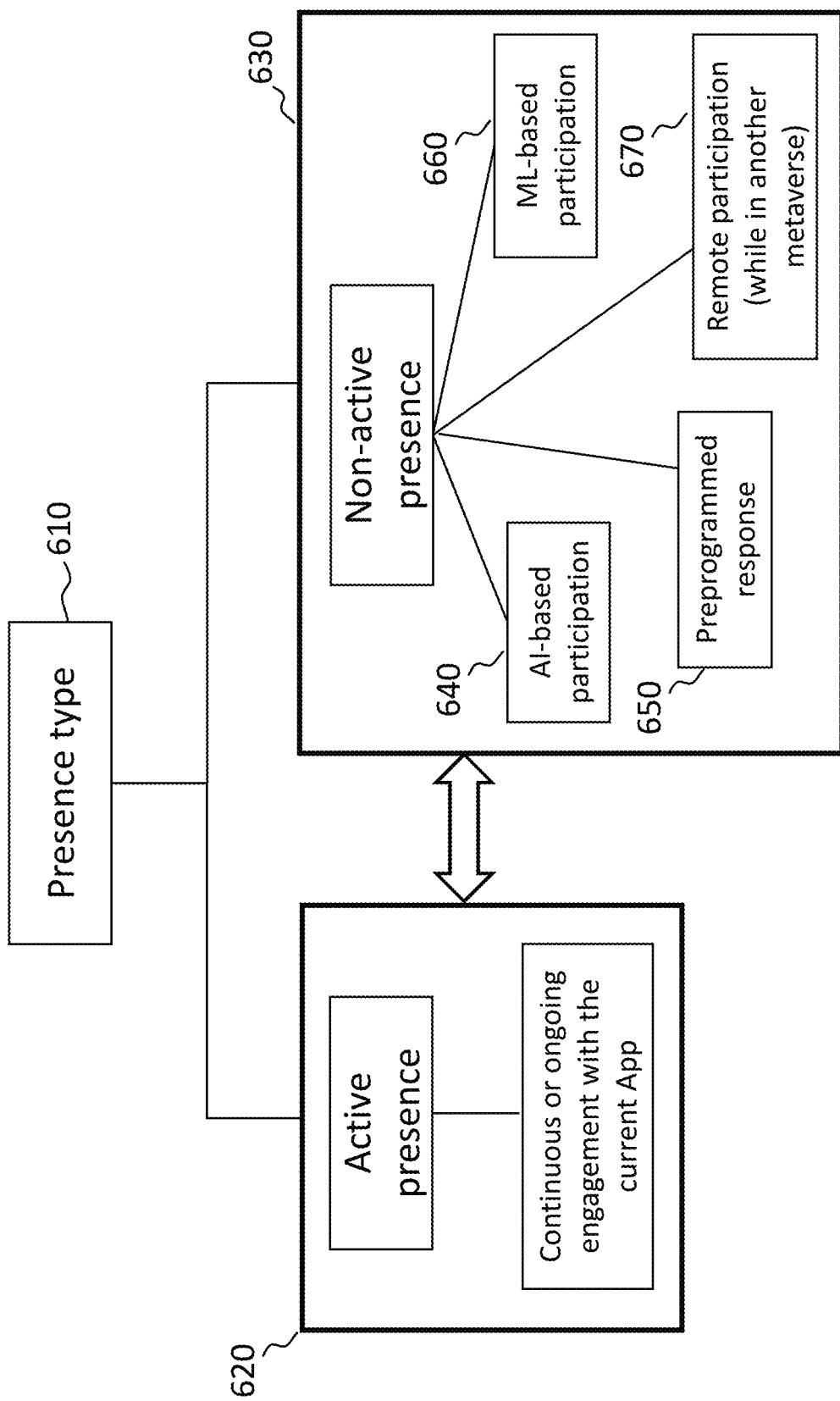
FIG. 6 is a block diagram of types of presence in multiple extended reality metaverses that are running concurrently, in accordance with some embodiments of the disclosure.

FIG. 5 is a flowchart of an overall process for simultaneously being present in multiple extended reality metaverses that are running concurrently, in accordance with some embodiments of the disclosure. In some embodiments, the control circuitry 220 and/or 228 may determine whether the user is actively present in the current XR application or not actively present in the current XR application, as depicted in blocks 510 and 520. As depicted in FIG. 6, the type of presence in multiple extended reality metaverses that are running concurrently may be determined. In some embodiments, the control circuitry 220 and/or 228 may determine that the user is actively present in an XR application based on the user's continuous or ongoing engagement with the current app. As depicted in block 515 of FIG. 5 and 620 of FIG. 6, this may include determining the user's current gaze and manual responses provided by the user and how they correlate with the XR application currently displayed; which app is rendered on the user's display of the XR device; types of engagements with the app displayed on the user's XR device; and time spent with the displayed app.

If a determination is made that the user is currently actively present in the XR app, then, as depicted in block 517 of FIG. 5, processes relating to rendering of the app are executed. Further details of such rendering are described in relation to the description of FIGS. 22-27.

Referring to FIG. 6, the control circuitry 220 and/or 228 may determine that the user is not actively present in an XR app. Such a determination may be made based on any one or more of the same factors that are used to determine whether a user is actively present, such as the user's gaze, manual movements made by the user and how they correlate to actions in an app, etc.

As depicted at block 630, when a determination is made that the user is not actively present, the control circuitry 220 and/or 228 may use any one of AI-based 640, ML-based 660, preprogrammed response 650, or remote participation 670 techniques to respond to a query or event generated in the XR application.

Figure 7:
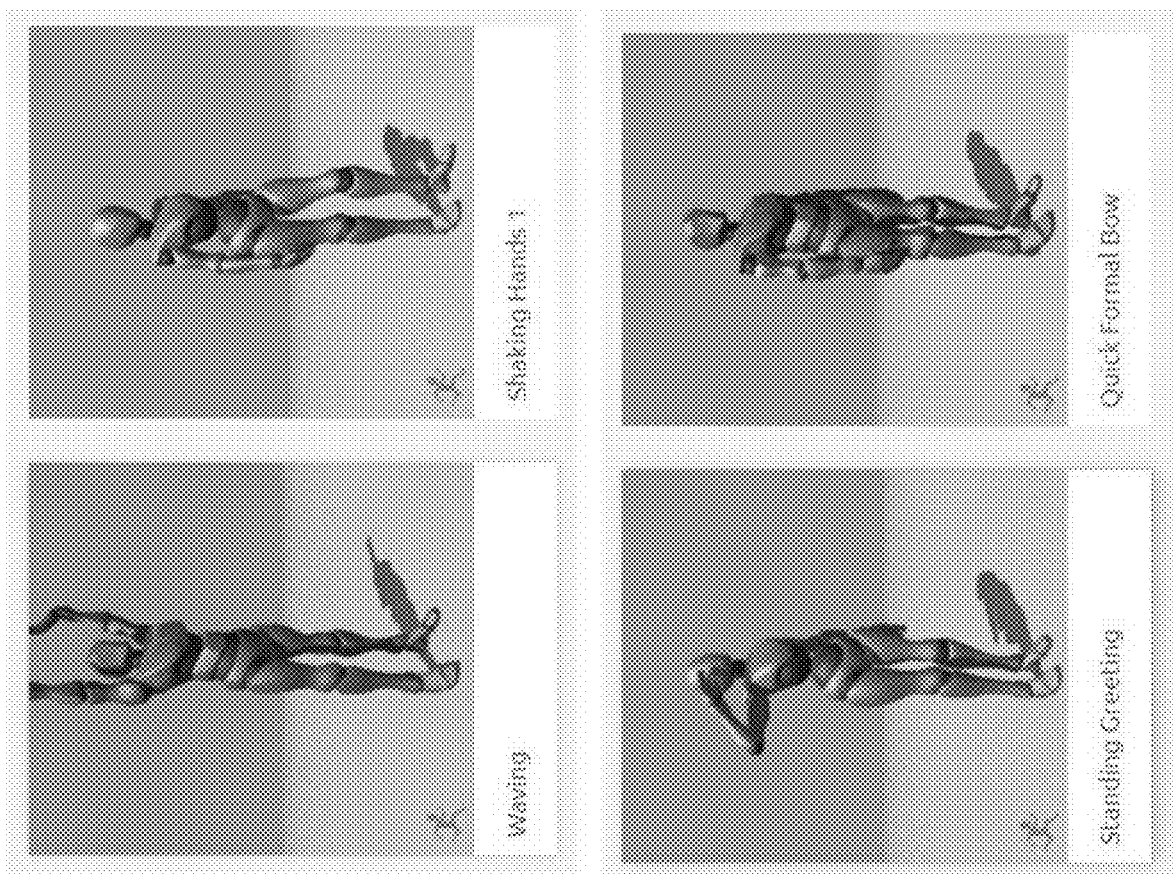
FIG. 7 is an example of a plurality of avatars used in multiple extended reality metaverses that are running concurrently, in accordance with some embodiments of the disclosure.

The response may be provided via an avatar, such as an avatar depicted in FIG. 7. The user may select different types of avatars in different XR applications that are currently running on the user's XR device. The avatars may be user-selected or may be system-defined by each application. The avatars may also be customized such as having different colors or different features such that the user can easily distinguish each XR app based on the avatar in the XR app that represents the user.

The AI-based participation or response 640 includes the control circuitry 220 and/or 228 invoking an AI engine to analyze a situation, query, or an event that occurs in the XR application and use an AI algorithm to analyze the context of the situation, query, or event. Based on these analyses, using the suggestions made by executing the AI algorithm, the situation, query, or event may provoke a response or a type of participation, via the avatar, in the XR application in which the user is not actively present.

The ML-based participation or response 660 includes the control circuitry 220 and/or 228 invoking an ML engine to gather data relating to previous responses provided by the user. If the current situation, query, or event is similar to a previous event in which the user may have responded, then the control circuitry 220 and/or 228, using the ML data gathered by the ML engine executing an ML algorithm, may provide a response, via the avatar, to the situation, query, or event.

The preprogrammed-based participation of response 650 includes the control circuitry 220 and/or 228 storing a plurality of preprogrammed verbal and non-verbal responses in a storage. These may be voice inputs, responses, gestures, and other motions that a user may have stored in their profile. In other embodiments, the control circuitry 220 and/or 228 may determine types of events and situations that may have occurred in the XR app, whether the user has participated in them or not, and queried the user to obtain the user's responses and store them as preprogrammed responses. For example, in virtual meetings that typically occur on a Monday morning, the control circuitry 220 and/or 228 may determine that a common question asked in such meetings is "How was your weekend?" If the control circuitry 220 and/or 228 determines that the user has not on their own initiative recorded a voice input to address such a query if it comes up, then control circuitry 220 and/or 228 may query the user and seek such a response anticipating that such a query is commonly asked in a meeting that occurs on a Monday morning. The control circuitry 220 and/or 228 may use utilize an AI algorithm to determine what types of standard queries, situations, and events may potentially occur based on the type of XR application used in which a user may need to provide a response. The preprogrammed response may be executed via the avatar in the XR app.

The remote participation or response 670 includes the control circuitry 220 and/or 228 seeking a response from the user while they are actively present in another XR application. For example, the control circuitry 220 and/or 228 may send a message to the user while they are actively present in another XR app such that the user may quickly respond to the message, similar to responding to a text message, while still being actively present in another XR app. The control circuitry 220 and/or 228 may use such a response that is remotely provided by the user to respond, via the avatar, to the queries, situations, and events that occur in an XR app in which the user is not actively present.

Referring back to FIG. 5, at block 520, prior to responding to the queries, events, or situations in an XR app in which the user is not actively present, the control circuitry 220 and/or 228 may determine whether the queries, events, or situations in an XR app are relevant or significant enough that they warrant an automated response. In one embodiment, the process of determining significance of the queries, events, or situations in the XR app in which the user is not actively present is described in the description related to FIG. 4. In another embodiment, as depicted in blocks 523-529, relevancy, used in the same context as significance herein, is determined by the control circuitry 220 and/or 228 and related examples of determining whether the queries, events, or situations in an XR app are relevant are described in connection with FIGS. 8-12.

Figure 8:
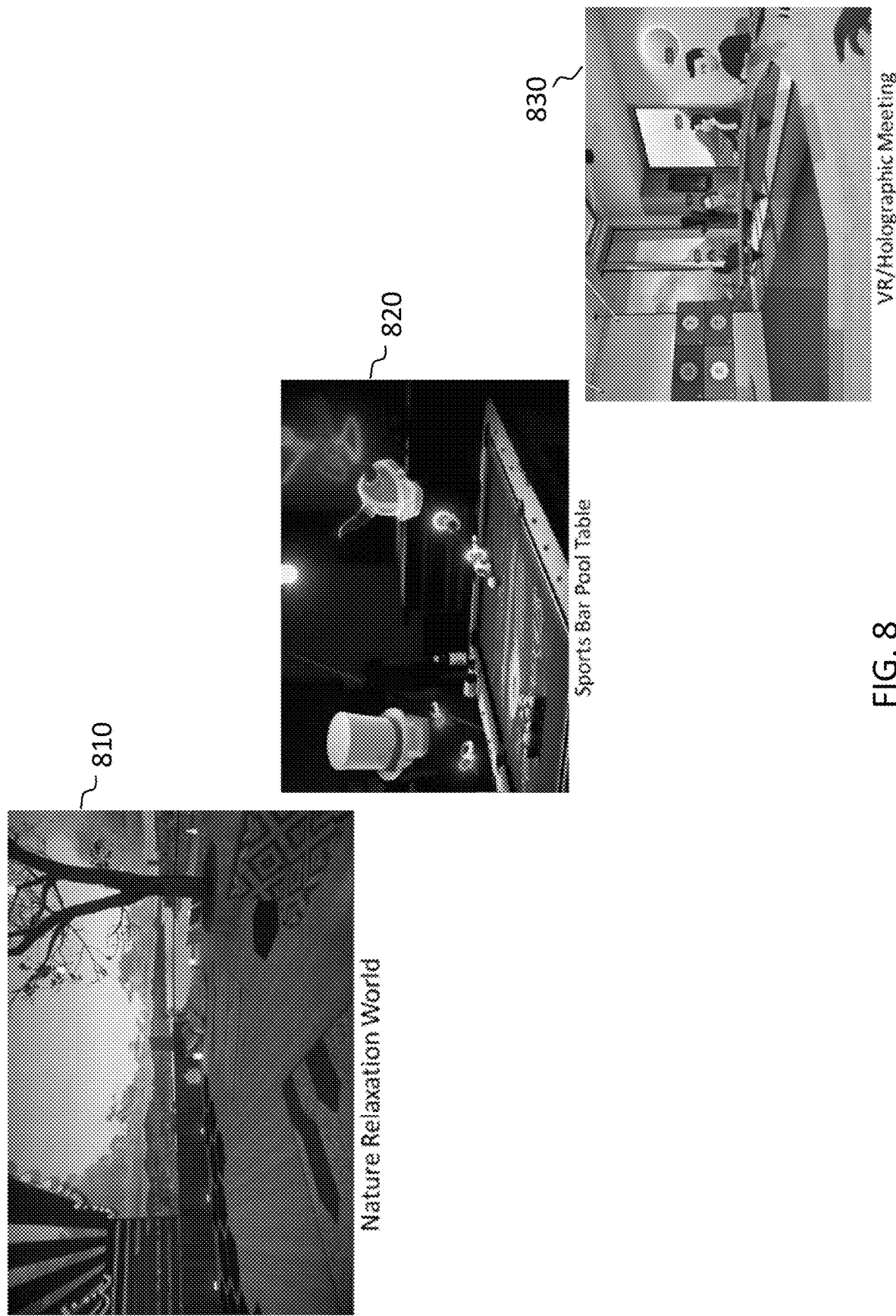
FIG. 8 is an example of types of extended reality (XR) applications running concurrently in the XR device, in accordance with some embodiments of the disclosure.

FIG. 8 is an example of types of XR applications running concurrently in an XR device, in accordance with some embodiments of the disclosure. In some embodiments, a user may have several XR apps running at the same time. As depicted in this embodiment, a user may have the following three XR apps running on their XR device: a) a VR/Holographic Meeting 830, b) a Nature Relaxation World 810 for relaxing and meditating and c) a Sports Bar Pool Table 820. What is relevant may depend on the type of app being used. For example, what is considered relevant in one app may not be considered relevant in another app, i.e., it may be app-dependent. For example, in a small VR/Holographic Meeting with a small number of people, such as three colleagues, someone making eye contact may be considered relevant enough to respond. However, in a crowded bar setting with many people, someone making eye contact may not be considered as relevant as the scenario with the small, intimate meeting.

Likewise, having a user's avatar not doing anything for long periods of time in a meditation setting may be acceptable. On the other hand, in a pool table setting it may not be acceptable to have your opponent wait when it's your turn on the pool table and the lapse of time may be more relevant and warrant a response or an action, such as taking your turn or saying something to delay taking your turn.

An example of a process to be present in multiple concurrently running XR apps via an avatar when the user may be actually present in one app will further be explained using the scenarios presented in blocks 810-830. In one embodiment, a user (John Doe), is concurrently in a VR/holographic meeting, a social world where he may relax and meditate in a nature setting while interacting with like-minded strangers, and a sports bar with friends where he occasionally steps in to take a turn at a pool table. These may be the three XR apps concurrently running on John's XR device.

In one embodiment, John is present in the work meeting via his avatar. He finishes his turn to present on "FY 2022 Patent Strategy" and takes questions from his colleagues. Mary, another user in the same XR app, is next, and while Mary is presenting, John has no interest in being present during her presentation on "FY 2022 Purchase Order Summary." To recharge, John switches XR apps and goes from being present in the VR/Holographic Meeting XR App 830 to the Nature Relaxation World XR App 810 without exiting the VR/Holographic Meeting XR App 830.

Based on the switch, the control circuitry 220 and/or 228 takes control of an existing avatar in the VR/Holographic Meeting XR such that it may automate any responses to significant events or queries that are relevant to the user. If an avatar did not exist, then an avatar is created to represent the user.

The control circuitry 220 and/or 228 also stops rendering the VR/Holographic Meeting XR, since the user no longer is present in the app and does not need to visualize it. The VR/Holographic Meeting XR activates back-end processing of the VR/Holographic Meeting XR such that notification and summaries relating to events in the meeting can be provided to the user, state packets can be sent to the system, and real-time information can be generated and stored such that if the user returns to the app, the rendering can pick up in real time showing the most current visualization of the app.

While John is away from the meeting and present in another app, the control circuitry 220 and/or 228 may notify John if his name is called, or a subject of interest such as "patents" is uttered. The control circuitry 220 and/or 228 may also respond with pre-programmed behaviors or AI- or ML-based responses as discussed in connection with FIG. 6. Further, a transcription of everything that is said related to patents or patent strategy may be presented to John in real time in the event and response summary. John may also set preferences for the summary such that the summary is shorter or more concise.

While John meditates in another app, the Nature Relaxation World XR App 810, John may receive the notification sent by the control circuitry 220 and/or 228 if a query or an event takes place in the VR/Holographic Meeting app 830 that is significant and requires John's attention.

While John meditates in another app, in one embodiment, John may get a notification that his friend, who has finished a round of pool, is addressing him, asking whether he would like to play. This notification may be sent from the control circuitry 220 and/or 228 since John is concurrently running the Sports Bar Pool Table app 820 on his XR device. If John's gaze goes towards the notification, which may appear in the corner of a screen (or any other part of the display of the XR device), depending on what John was doing in the Nature Relaxation World XR App 810 at the time the notification was received, the control circuitry 220 and/or 228 may invoke a masking engine to perform a masking function. For example, if John was performing a motion in the Nature Relaxation World XR App 810, John's gaze was directed towards another user, or John had a particular pose, such as his head faced towards a particular direction, then the masking function would continue whatever motion, gaze, or pose John was in such that his head movement to view the notification is not noticed in the app 810. By performing a masking function, the control circuitry 220 and/or 228 makes John's avatar continue the motion, gaze, or pose such that John's actual head movements, such as John suddenly turning his head to read the modification, are masked, thereby preventing other users from noticing that John is distracted.

When John reviews the notification of his friend asking John if he would like to play, John may have several choices. In some embodiments, John may provide a response. In other embodiments, John may have prepared a response to such a question knowing that his turn on the pool table would be forthcoming, or John may decide to jump back into the app and play his turn. John may also do nothing, and the AI may take over and respond automatically.

In one embodiment, John may have prerecorded the response: "Give me a few minutes to check," and control circuitry 220 and/or 228 may provide that response to the friend/other pool player.

In another embodiment, John may decide to switch back to VR/Holographic Meeting app 830. John may perform a motion, sequence of motions, or gesture to indicate to the control circuitry 220 and/or 228 which app to switch to. Such motion, sequence of motions, or gesture may be preprogrammed to be associated with switching to the specific app, similar to using a remote and pressing a channel to go to a specific channel.

When John switches to the work meeting, he notices Patrick is presenting on "FY 2022 Real Estate Acquisitions." All the while John was away, an AI agent was already mimicking human head and hand movements in the meeting via John's avatar such that no one in the meeting noticed that John was away, when in reality John was actively present in the Nature Relaxation World XR app 810 or the pool table app.

When John returns to the app and takes active control of his avatar, nobody notices. Assured that he is not missing anything of relevance, he switches to the VR pool social world and plays a few rounds of pool. He talks to his friend for a while, and then gets a notification that Maggie, his supervisor, is addressing the meeting room. He tells his friend that he may join back in a while, and switches back to the VR meeting.

Every time John leaves an app, John's avatar is automatically controlled. The control circuitry 220 and/or 228 may provide automated responses using any of the methods described in the description related to FIG. 6. The control circuitry 220 and/or 228 may also provide notifications to John if anything of significance requires his attention. The control circuitry 220 and/or 228 may also provide a summary of events in the app to keep John updated. The control circuitry 220 and/or 228 may also stop rendering the app and initiate back-end simulation processing. Once John is back in the app, the control circuitry 220 and/or 228 may delete the back-end processing, or only keep last few minutes of the processing, to clear the buffer and make space for future simulation storage. In this manner, John remains multi-located and multi=present in multiple applications, or social worlds, in the metaverse.

Figure 9:
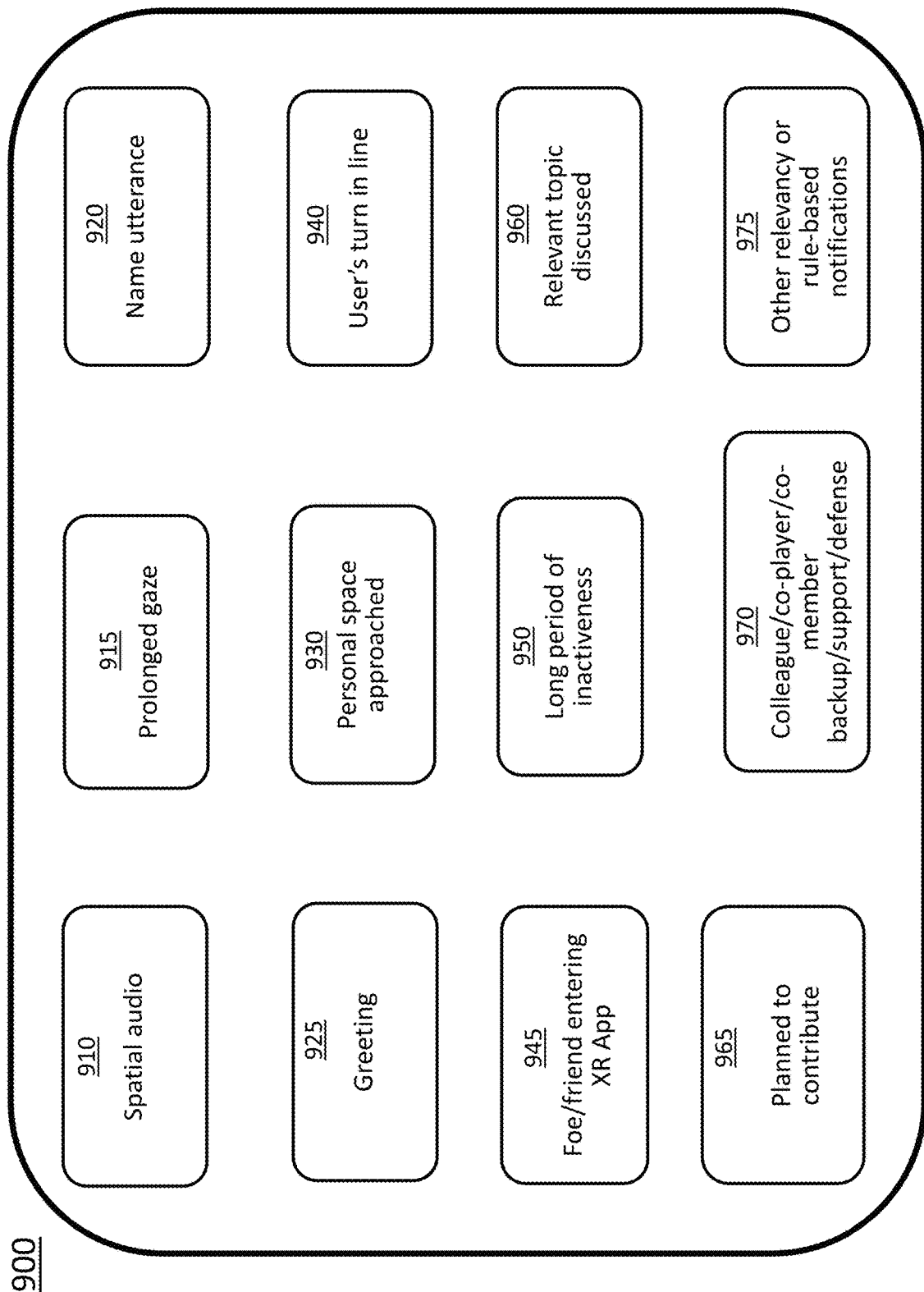
FIG. 9 is a block diagram of relevant events that may require a response from an avatar in an XR application in which the user is not present, in accordance with some embodiments of the disclosure.

FIG. 9 is a block diagram of relevant events that may require a response from an avatar in an XR application in which the user is not present, in accordance with some embodiments of the disclosure.

In one embodiment, the control circuitry 220 and/or 228 may determine that an event, query, or situation in the XR app in which the user is not actively present is significant and may warrant a response based on the control circuitry 220 and/or 228's analysis of spatial audio 910. Spatial audio may include any audio within a threshold range of the user's headset in the real world and within the threshold range of the user's avatar in the virtual world. The analysis of the spatial audio may include determining whether an audio input that relates to the user, such as someone uttering the user's name or discussing a topic relevant to the user. The control circuitry 220 and/or 228 may analyze all such inputs to determine relevancy. If the control circuitry 220 and/or 228 determines the spatial audio to be relevant, then the control circuitry 220 and/or 228 may include spatial audio and/or events surrounding and related to the spatial audio as part of a notification to the user as well in a summary such that the user is kept aware of such relevant events.

In one embodiment, the control circuitry 220 and/or 228 may determine that an event, query, or situation in the XR app in which the user is not actively present is significant and may warrant a response based on the control circuitry 220 and/or 228's analysis of gaze or prolonged gaze 915. In this embodiment, the control circuitry 220 and/or 228 may monitor the gazes of other users in the XR app and determine if their gaze is directed towards the user. In some circumstances, such as in a crowded place, such as a sporting event, theater, or a bar, where there may be hundreds of people and their gazes may be directed towards the user, the control circuitry 220 and/or 228 may associate such a gaze as not being relevant to the user. However, if a gaze is directed at the user in a meeting, in a small setting, or by another user that is familiar to the current user, or in a familiar or social environment, then the control circuitry 220 and/or 228 may determine that such a gaze is relevant to the user. The control circuitry 220 and/or 228 may also monitor a prolonged gaze by another user towards the current user. For example, if a first gaze from someone unfamiliar to the user was deemed to be irrelevant, a prolonged gaze by the same user towards the current user may be determined by the control circuitry 220 and/or 228 to be relevant due to its prolonged nature. If the control circuitry 220 and/or 228 determines the gaze or prolonged gaze to be relevant, then the control circuitry 220 and/or 228 may include gaze, prolonged gaze and/or events or information surrounding and related to the gaze or prolonged gaze, such as who the person looking at the user is, what the context is, etc., as part of a notification to the user or in a summary such that the user is kept aware of such relevant events.

In one embodiment, the control circuitry 220 and/or 228 may determine that an event, query, or situation in an XR app in which the user is not actively present is significant and may warrant a response based on the control circuitry 220 and/or 228's analysis of name utterance 920. If the control circuitry 220 and/or 228 determine that the current user's name is uttered by another user of the XR app, then the control circuitry 220 and/or 228 may determine that such a name utterance is relevant to the user. In some circumstances, such as in a crowded space, if the control circuitry 220 and/or 228 determines that somebody uttered the user's name, however their utterance was not directed towards the user, then the control circuitry 220 and/or 228 may not deem such an utterance as relevant. To determine whether the utterance relates to the user, the control circuitry may analyze additional audio surrounding the utterance of the name, including other motions and gestures surrounding the utterance of the name. For example, if another user utters the current user's name and at the same time is waving their hand directed at the current user, then the control circuitry may determine such an utterance of the user's name is relevant. If the control circuitry 220 and/or 228 determines the name utterance to be relevant, then the control circuitry 220 and/or 228 may include events surrounding and related to the name utterance as part of a notification to the user. The notification may be an alert informing the user that their name has been uttered or in addition to the alert, the control circuitry 220 and/or 228 may also provide a summary such that the user is informed of the context in which the name was uttered.

In one embodiment, the control circuitry 220 and/or 228 may determine that an event, query, or situation in an XR app in which the user is not actively present is significant and may warrant a response based on the control circuitry 220 and/or 228's analysis of greeting 925. For example, the control circuitry 220 and/or 228 may determine that a greeting, such as "Hello," a waving of a hand, phrases related to a greeting such as "How are you?" and all similar variations to be relevant to the user. It may also depend on who the person giving the greeting to the user is. If the control circuitry 220 and/or 228 determines the greeting to be relevant, then the control circuitry 220 and/or 228 may include the greeting and/or events surrounding and related to the greeting as part of a notification to the user or in a summary such that the user is kept aware of such relevant events.

In one embodiment, the control circuitry 220 and/or 228 may determine that an event, query, or situation in an XR app in which the user is not actively present is significant and may warrant a response based on the control circuitry 220 and/or 228's analysis of personal space approached 930. The control circuitry 220 and/or 228 may monitor the personal space around the user in the real world as well as in the virtual world. If another individual approaches the current user within a threshold distance in the real world or the virtual world, the control circuitry may determine that such an approach requires a response from the user. Perhaps someone is coming close to shake hands with a user. Perhaps someone is coming close to attack the user in a game setting. Perhaps somebody is providing an object to the user and the user needs to respond by moving their hand towards the person to accept or take the object. As such, any situations in which personal space is approached may be deemed relevant by the control circuitry 220 and/or 228. On the other hand, in a crowded space where personal space tight, such as in a crowded sports bar or football game, the control circuitry 220 and/or 228 may determine that personal space approached by another user is not of significant relevance to the user. If the control circuitry 220 and/or 228 determines the personal space approach to be relevant, then the control circuitry 220 and/or 228 may include personal space approach details and/or events surrounding and related to the personal space approach as part of a notification to the user or in a summary such that the user is kept aware of such relevant events.

In one embodiment, the control circuitry 220 and/or 228 may determine that an event, query, or situation in an XR app in which the user is not actively present is significant and may warrant a response based on the control circuitry 220 and/or 228's analysis of user's turn in line 940. For example, in some embodiments, an XR app may involve the user's avatar waiting in the line to get to a specific place or enter some space. For example, the user's avatar may be waiting in a line for movie tickets or a sporting event or it may be waiting in line to get inside a venue. When the control circuitry 220 and/or 228 determines that the user's turn is next, or very close to the next, then the control circuitry may determine such an event to be relevant and notify the user.

In one embodiment, the control circuitry 220 and/or 228 may determine that an event, query, or situation in an XR app in which the user is not actively present is significant and may warrant a response based on the control circuitry 220 and/or 228's analysis of a friend or foe entering the same XR app. For example, in a competitive setting, a user may want to know if their rival has entered the same app. In another setting the user may want to know that their boss has entered the meeting. In yet another setting, the user may want to know a list of certain individuals that may be considered as friends or foes when they enter the same XR app that the user is running. If the control circuitry 220 and/or 228 determines that such an identified friend/foe or colleague has entered the meeting or the game, then such entering (or exiting) may be determined to be relevant and it may include events surrounding and related to such entering and exiting as part of a notification to the user and/or in a summary such that the user is kept aware of such relevant events.

In one embodiment, the control circuitry 220 and/or 228 may determine that an event, query, or situation in an XR App in which the user is not actively present is significant and may warrant a response based on the control circuitry 220 and/or 228's analysis of long periods of inactiveness 950. The control circuitry 220 and/or 228 may analyze whether a long period of inactiveness is acceptable based on the type of XR application being used. For example, a long period of saying nothing in a meeting in which your boss is involved may be considered as relevant to the user since such long durations of inactiveness may be associated with the user not contributing to the meeting. On the other hand, long periods of inactiveness in a meditation app may be perfectly acceptable. If the control circuitry 220 and/or 228 determines a long period of inactiveness to be relevant, then the control circuitry 220 and/or 228 may notify the user and include a summary of events that have been occurring in the XR App such that the user is kept aware.

In one embodiment, the control circuitry 220 and/or 228 may determine that an event, query, or situation in an XR app in which the user is not actively present is significant and may warrant a response based on the control circuitry 220 and/or 228's analysis of a relevant topic being discussed 960. As described in the example above, if John has presented on a topic related to patents, and that topic comes up and is being mentioned by another user in the XR app, then the control circuitry 220 and/or 228 may determine such a mention to be relevant to the user. The control circuitry may also further analyze and determine if such topic's name was mentioned in passing or requires further attention from the user for it to be considered relevant. If the control circuitry 220 and/or 228 determines the mention of the topic to be relevant, then the control circuitry 220 and/or 228 may include events surrounding and related to the mention in a notification to the user and include a summary such that the user is kept aware of such relevant events and the context surrounding the events.

In one embodiment, the control circuitry 220 and/or 228 may determine that if the user had planned to contribute 960 to something, that may be relevant. For example, in the meeting app, the user may have planned to contribute to a topic when it comes up regardless of whether the user was assigned to discuss such a topic. The user may have also wanted to contribute at a certain stage in a game. Other scenarios may be presented where the user may have planned to contribute. If the control circuitry 220 and/or 228 determines that a topic about which the user had wanted to contribute has occurred, then the control circuitry 220 and/or 228 may determine such time or topic to be relevant and may include events surrounding the time or topic in a notification to the user and in a summary such that the user is kept aware of such relevant events.

In one embodiment, the control circuitry 220 and/or 228 may determine that the user may want to back up, support, or defend another user or colleague in a game, meeting, or other circumstance. When such an occasion arises in the XR app, the control circuitry 220 and/or 228 may deem it to be relevant and notify the user as well as include details surrounding it in a summary.

Although a few examples of what is relevant are discussed above, the user may also set up rules 975 for the control circuitry 220 and/or 228 to determine what is relevant. If such occurrence of relevance arises, then the control circuitry 220 and/or 228 may notify the user and include events surrounding and related to the occurrence as well as include details surrounding it in a summary such that the user is kept aware of such relevant events.

FIGS. 10-12 are additional examples of determining relevancy. If relevancy is determined, then control circuitry notifies the user and includes the relevant event and/or additional information surrounding the relevant event in the notifications and summary to the user.

FIG. 10 is an example of determining relevancy and significance of an event in an XR application based on another user addressing the avatar, in accordance with some embodiments of the disclosure. In this embodiment, the control circuitry 220 and/or 228 may activate a relevancy determination module 1000. The relevancy determination module 1000 may utilize an AI algorithm to determine relevancy. In this embodiment, a plurality of users that are present in an XR app in which the user is not actively present are depicted. These users include John, who is the user's schoolfriend; Pam, who is the user's cousin; Anand, who is the user's boss; and Myla, who is a stranger to the user. For the sake of this example, if all the users address the current user and utter the same phrase "How was your weekend?" the control circuitry may determine a relevance ranking based on which user is asking that question to the current user. As depicted, the control circuitry 220 and/or 228, in this embodiment, ranks Anand (Boss)'s query to the user with the highest rank of relevance and the stranger with the lowest rank of relevance. The user or the system may set certain parameters that indicate to the control circuitry that a notification and/or a summary should be generated only for those queries for which the relevance ranking is above a certain threshold. For example, if a user sets a relevancy threshold of three, where all relevancy rankings three and above should be used by the control circuitry to notify the user, then the control circuitry may only notify the user if John or Anand has asked the question to the user. As such, relevancy may be dependent upon which user in the XR app queries the user. Although a query in a meeting setting is used as an example, any virtual or metaverse app and any setting outside a meeting, such as a game, or any virtual environment setting, is also contemplated.

FIG. 11 is an example of determining relevancy and significance of a query addressed to the user's avatar by another user in an XR application based on the context of the query, in accordance with some embodiments of the disclosure. In this embodiment, a co-worker, John, may be querying the current user, Jose. Various queries are analyzed to determine their relevance ranking. John may have made a statement or queried the user by asking a) How are you, b) Where are we with the licensing report, c) Are you in for lunch with the team tomorrow, or d) Jose will be leading the meeting today. Since Jose, the current user, leading the meeting may be a significant event that requires the current user to be actively present, the control circuitry 220 and/or 228 may rank such a statement with the highest relevancy rank. More casual statements or questions such as "How are you" may be ranked lower since they do not require the presence of the user or can be answered automatically while the user is away in another app. Other statements that are uttered by John generally to everyone in the meeting, such as "Are you in for lunch," may receive a lower relevance ranking as they are not directed solely towards the current user. As such, the context of the query may be examined by the control circuitry 220 and/or 228 to determine the query's relevancy.

FIG. 12 is an example of determining relevancy and significance of an event in a virtual reality game, in accordance with some embodiments of the disclosure. In this embodiment, the control circuitry 220 and/or 228 may rank actions based on their relevancy to the game. For example, a situation in which the user is about to use their final life in the game upon which the game will end may be ranked the highest, indicating that the user's presence is direly needed to save the game. Based on such ranking the control circuitry 220 and/or 228 may notify the user and indicate that their presence is needed, and an auto-response may be insufficient.

Figure 13:
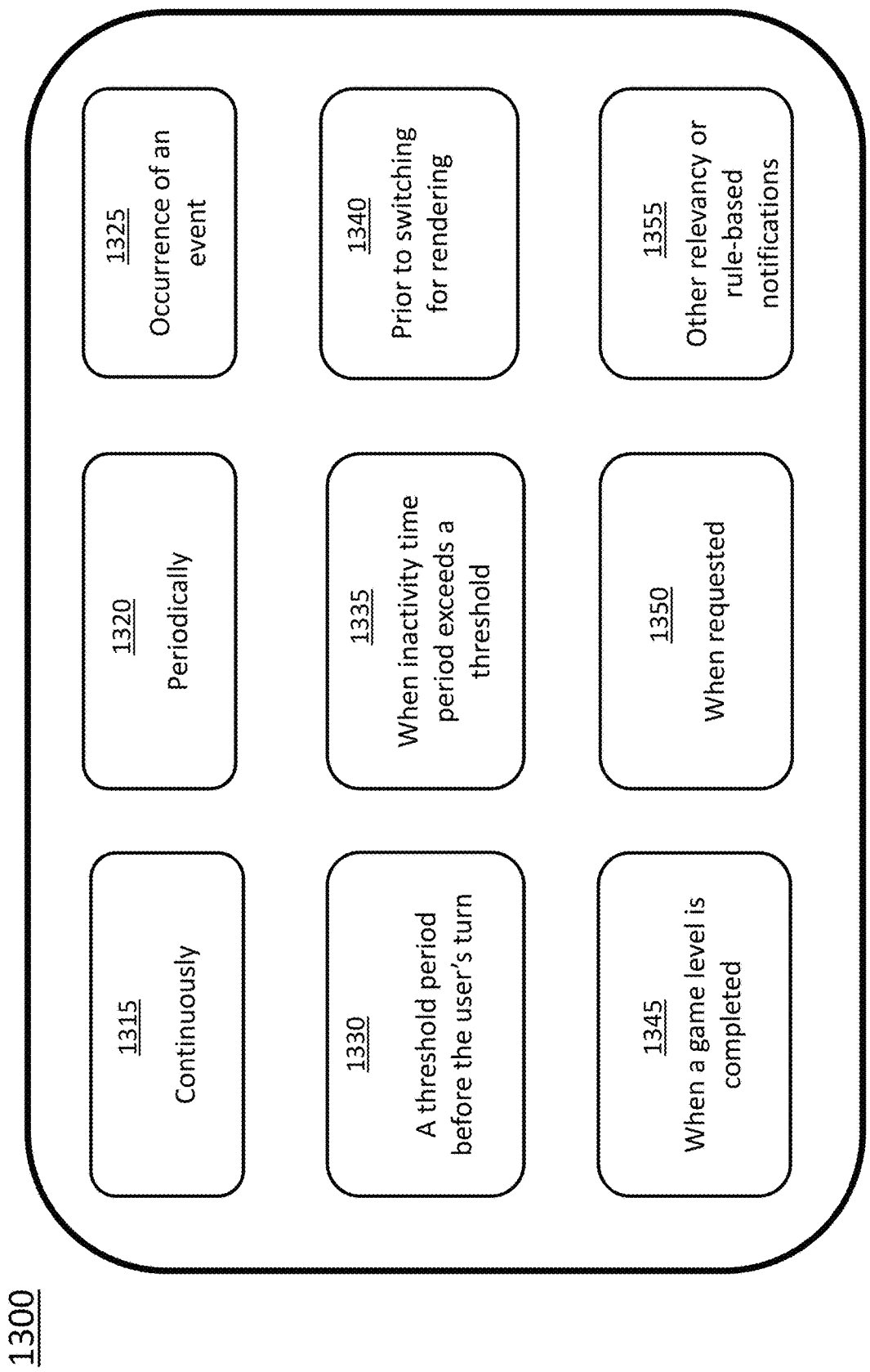
FIG. 13 is a block diagram of state packets from an XR application running in the metaverse that are sent to a system, server, or user, in accordance with some embodiments of the disclosure.
Figure 14:
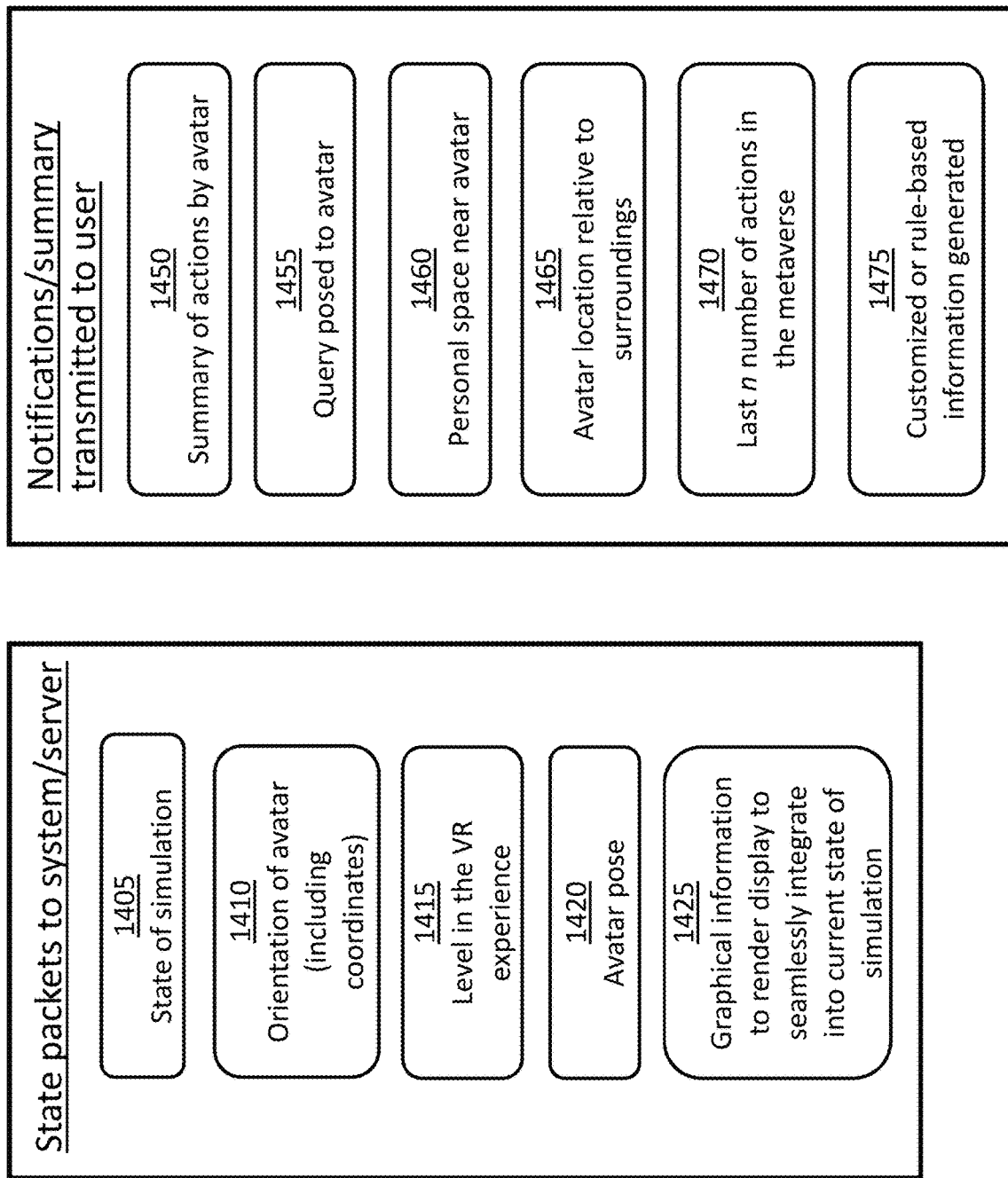
FIG. 14 is a block diagram of information sent in a state packet for an XR application running in the metaverse, in accordance with some embodiments of the disclosure.

Referring back to block 530 of FIG. 5, state packets may be generated by the control circuitry as further described in the descriptions related to FIGS. 13-14, which relate to sending of state packets by the control circuitry to the system or server. For all the concurrently running apps in which the user is not currently present, the state packets are sent to indicate the current state of events in each app such that the information can be used by the system or server to perform the processes and functions described herein. For example, the system or the server may use these state packets to plan CPU and GPU utilization, real-time simulation for apps in which user is not actively present, for determining what to render and when, etc. The state packets received may include information needed to seamlessly switch from back-end simulation processing to rendering the app without and frame delay or lag.

FIG. 13 describes when state packets are sent to a system or server. In one embodiment, as depicted at block 1315, the control circuitry 220 and/or 228 may be configured to send state packets to the system or server on a continuous basis 1315. In other embodiments, as depicted in blocks 1320 and 1325, the control circuitry 220 and/or 228 may be configured to send state packets on a periodic basis or upon occurrence of an event. Intervals for sending the state packets periodically or the type of events occurring for which state packages are sent may be determined by the control circuitry. For example, an occurrence of a significant event, such as the ending of a certain level of a game, or presenting by an individual in a conference, may be a triggering event for sending the state packet. In other embodiments, state packets may be sent on a set periodic basis unless an occurrence of a significant event occurs.

In some embodiments, state packets may be sent at a threshold period before the user's turn 1330. For example, if it is a user's turn to play on the pool table or a user's turn to discuss a topic in a meeting, state packets for events occurring just prior to their turn may be sent. Sending state packets just before their turn may allow the system to use the information from the state packets to render an image on the XR device based on the current events happening in real time in the XR app.

In another embodiment, state packets may be sent when an inactivity time period exceeds a threshold 1335. For example, if an avatar of the user is inactive for a threshold period of time, then, anticipating that a response is needed in the XR app to simulate the user's presence, or that the user may re-enter the app, the control circuitry 220 and/or 228 may be configured to send state packets anticipating such a response or return.

In another embodiment, state packets may be sent prior to switching the rendering 1340 from a current app to the app for which the user was not actively present. In this embodiment, when the control circuitry 220 and/or 228 receives an indication of a user's intent to switch from a current app and be actively present in another app, such as switching from App 2 to App 3 in blocks 102 and 106 of FIG. 1, the control circuitry 220 and/or 228 may be configured to send state packets prior to such rendering. As such, the control circuitry 220 and/or 228 may save on bandwidth and resources that may have been utilized if the state packets were sent continuously.

In another embodiment, state packets may be sent when a game level is completed, as depicted in block 1345, or whenever requested by the system or server, as depicted in block 1350. In yet another embodiment, state packets may be sent based on rules set by the system or server, as depicted at block 1355, for receiving the state packets.

Similar to sending state packets, the control circuitry 220 and/or 228 may be configured to send notifications continuously, periodically, upon occurrence of an event or otherwise when triggered similar to blocks 1315-1355 occurring in an app.

FIG. 14 is a block diagram of information sent in a state packet for an XR application running in the metaverse, in accordance with some embodiments of the disclosure. In some embodiments, the state packets sent may include information that can be used by the server or system to determine the state of simulation 1405. In other embodiments, the state packets sent may include information relating to the orientation of the avatar 1410, including the coordinates of the avatar. For example, the avatar may be in motion or may be moving from one location to another location in the virtual world. The state packet sent may inform the system or the server in real time of the current and exact location of the avatar such that the information may be used for rendering, making decisions, or responding to an action as needed.

In some embodiments, the state packets sent may include a level in the VR experience 1415. For example, in a gaming app, which may have several levels, such as levels one through 10, the information included in the state packets may identify which level of the 10 levels the avatar is currently in.

In other embodiments, the state packets sent may include the avatar's pose 1420. This may include the pose of some or all body parts of the avatar such that the system or server may recreate the rendering of the avatar when the user returns to an active presence in the app. Any other graphical information to render display such that it may seamlessly integrate into the current state of simulation 1425 may also be sent via the state packets.

In some embodiments, the control circuitry 220 and/or 228 may include similar information as sent to the system or server in the state packets for sending to the user. For example, the control circuitry 220 and/or 228 may notify the user or provide a summary to the user that includes a summary of actions by the avatar; queries directed at the avatar; personal space near the avatar, such as if the personal space was approached by someone; the location of the avatar relative to its surroundings; or the last threshold number of actions in the metaverse that were conducted by the avatar or other users in the app. Although some examples of information that may be included in the notification in summary were discussed, the embodiments are not so limited, and any customized or rule-based information may also be generated and used in the notification and/or summary to the user.

Figure 15:
FIG. 15 is an example of a type of notification displayed on a display of an XR device, in accordance with some embodiments of the disclosure.

FIG. 15 is an example of a type of notification displayed on a display of an XR device, in accordance with some embodiments of the disclosure. In this embodiment, a user wearing an XR device that has a display is shown a notification in a pop-up format. As depicted, the notification may be shown in both sides of the XR device, such as for the pair of eyes of the user, or on either one of the sides. The notification may also provide options for the user to select. These selections may include a) view the interaction, b) switch to the VR chat or c) simply selecting done to acknowledge the receipt of the notification. The notification may also allow the user to send a message remotely to their avatar in the other app such that the avatar performs the instruction or utters speech related to the words uttered in the message.

Figure 16:
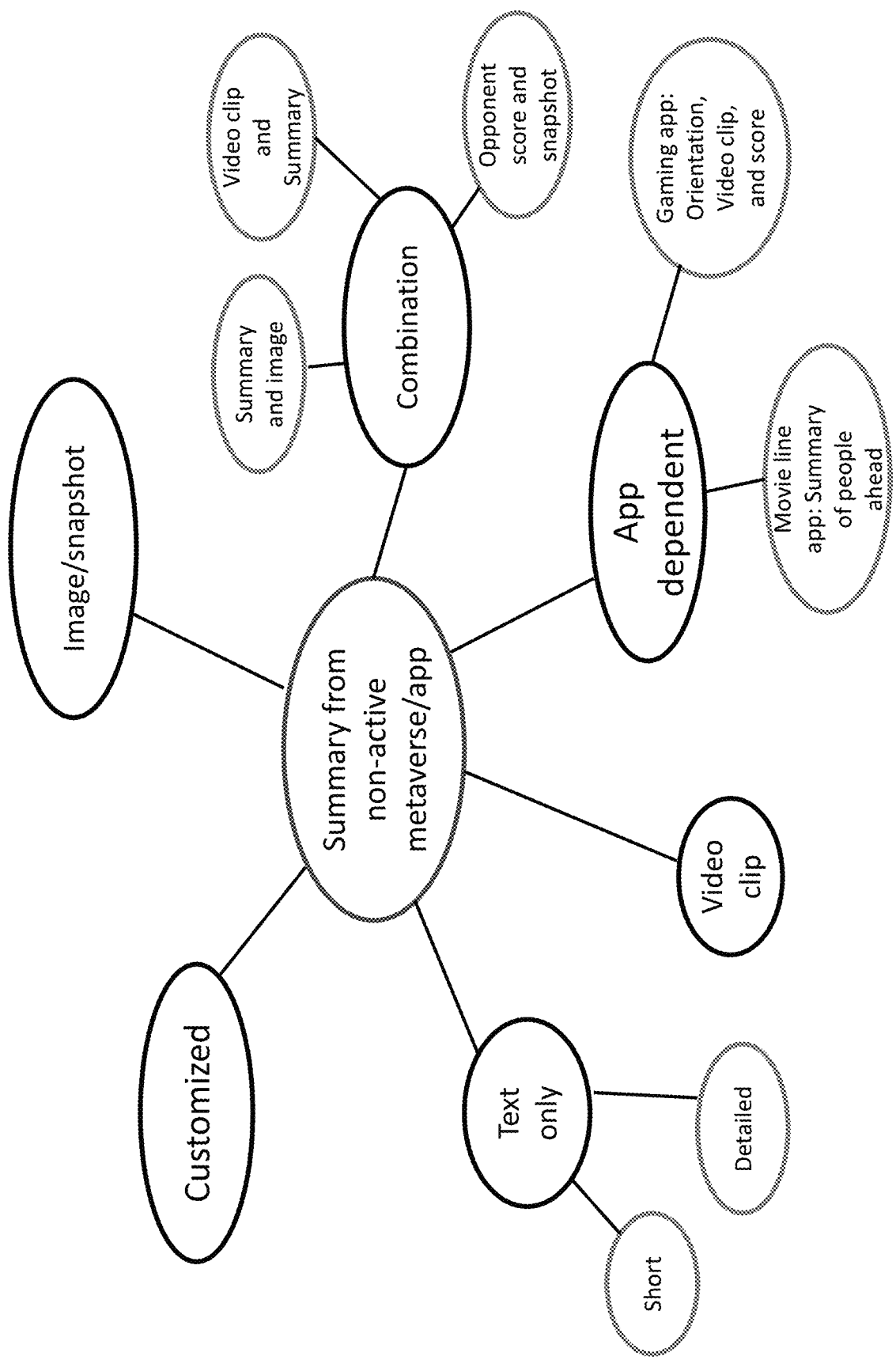
FIG. 16 is an example of types of information sent in a summary for an XR application running in the metaverse in which the user is not actively present, in accordance with some embodiments of the disclosure.

FIG. 16 is an example of types of information sent in a summary for an XR application running in the metaverse in which the user is not actively present, in accordance with some embodiments of the disclosure. In some environments, the control circuitry 220 and/or 228 may generate a summary from an XR app in which the user is not actively present and transmit the summary to the user such that the user is kept informed of the activities taking place in the app.

In some embodiments, the summary generated by the control circuitry 220 and/or 228 may be a text-only summary. The summary may be short, or a detailed summary, as preferred by the user. In another embodiment the summary may be in the form of video clip.

In yet another embodiment the summary may depend on the app used. For example, if the app relates to a user standing in a line for a movie, then the summary may include the user's position in the line and how many people are ahead of them to reach the end of the line. If the app relates to a gaming app, then the summary may include information such as the avatar's orientation, a video clip of the latest occurrences, and the score in the gaming app.

In some embodiments, the summary may be a combination of a few elements. For example, a summary may include an image and a summary or a video clip of an opponent scoring a snapshot. Any other combination as desired by the user and inputted into the user settings may be used by the control circuitry to generate the summary and include the requested information.

Referring back to block 530 of FIG. 5 and subcategory 535, masking 535 is yet another embodiment provided by the control circuitry, as discussed in relation to FIG. 17, which is an example of a masking action performed by a masking module in response to a notification presented to the user, in accordance with some embodiments of the disclosure. In some embodiments, a masking operation is performed in an XR app in which the user is actively present. The control circuitry 220 performs the masking operation to mask what a user is doing, such as a performing an action or motion, or directing their gaze somewhere else, that is unrelated to being present in the current app, or otherwise directed to the notification or performing an action in another XR app. Such unrelated action, or the distraction, is masked such that it is not noticeable in the app in which the user is actively present. For example, while being actively present in an app, if the user's gaze suddenly turns in another direction that is unrelated to the activities in the app, the masking operation is performed to mask the user's distraction. The masking operation thereby results in the user's avatar continuing to perform the action they were performing prior to the distraction.

As depicted in the example of FIG. 17, a user's current pose may be looking 35° to the left of the origin via their XR device. Upon the occurrence of the distraction, which may be a notification or a summary, the user may look away 63° to the left of the origin. In this embodiment, the masking or smoothing action would mask the user's look at 63° and make it look like the user is still looking at 35° to the left of the origin such that the user being distracted is not noticed. When that user returns in the current app after the diversion and looks at an angle of 46° to the left of the origin, the masking action may transition from the current pose at 35° to at 46° over a threshold period such that the movement does not seem choppy or have skips in images.

Figure 18:
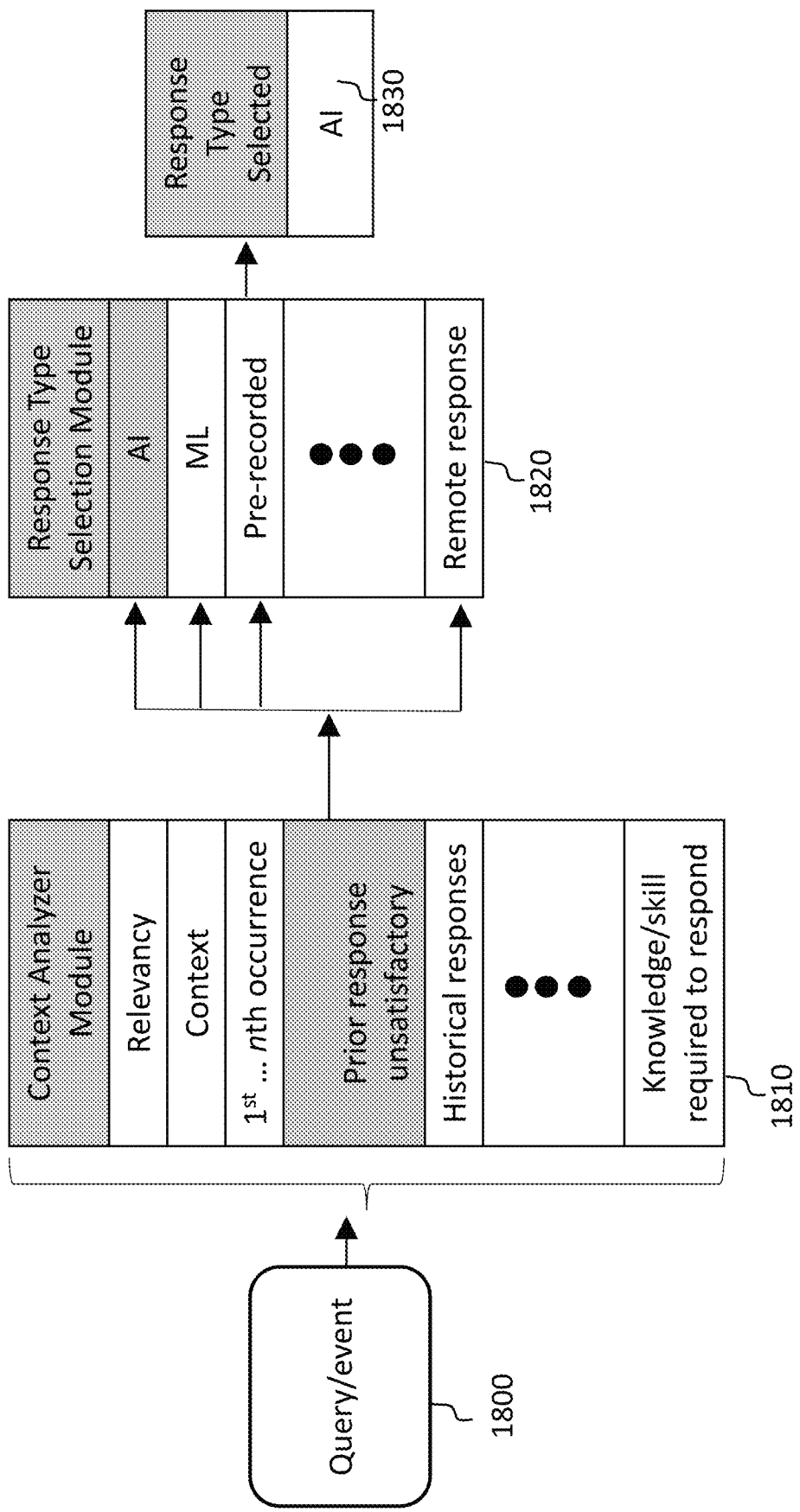
FIG. 18 is a flowchart of a process for determining a type of auto-response to be used based on the context of the query or event in an XR application in which the user is not actively present, in accordance with some embodiments of the disclosure.

Referring back to FIG. 5, at block 540, processing involving auto-responses may be performed by the control circuitry. These processes are further discussed in relation to FIGS. 18-19. FIG. 18 is a flowchart of a process for determining a type of auto-response to be used based on the context of the query or event in an XR application in which the user is not actively present, in accordance with some embodiments of the disclosure.

In some embodiments, as depicted at block 1800, a query or an event occurring in an app in which the user is not actively present may be analyzed by the control circuitry. Upon detection of the query or event, the control circuitry may utilize a context analyzer module to analyze the context of the query or the event. The context analyzer may analyze based on a plurality of factors. These factors may include, but are not limited to, relevancy, context, number of occurrences, a prior response and whether it was unsatisfactory, historical responses, and the knowledge and skill required to respond to the event in the app.

In terms of relevancy and context, the context analyzer may perform processes as discussed in relation to FIGS. 8-12. The context analyzer may also determine whether the same query or event has occurred multiple times such that a higher weight may be associated with its context. An example of this would be another user asking the same or similar question to the user multiple times thereby indicating that the user's response is not satisfactory.

The response type selection module may select one of the response types based on the analysis performed by the context analyzer module. For example, if a query or event requires the user's detailed knowledge or skill, then the response type selection module may determine that an AI- or ML-based response may not be sufficient and either a remote response from the current user or the current user re-entering the app to be actively present may be required. In other embodiments, if a determination is made that a prior response provided by the user based on their prerecorded responses is deemed to be unsatisfactory, then the response type selection module may determine that an AI-based response may be more appropriate. In yet another embodiment, the response type selection module may determine that historical responses provided by the user can be used and as such may invoke an ML-based response.

In this embodiment, as an example, the context analyzer module may determine that prior responses provided by the user, which were based on prerecorded or preprogrammed responses, are unsatisfactory. In other words, the responses provided did not address the type of query or event occurring in the app. As such, the response type selection module may determine that an AI-based response is better suited for such an event or query.

Figure 19:
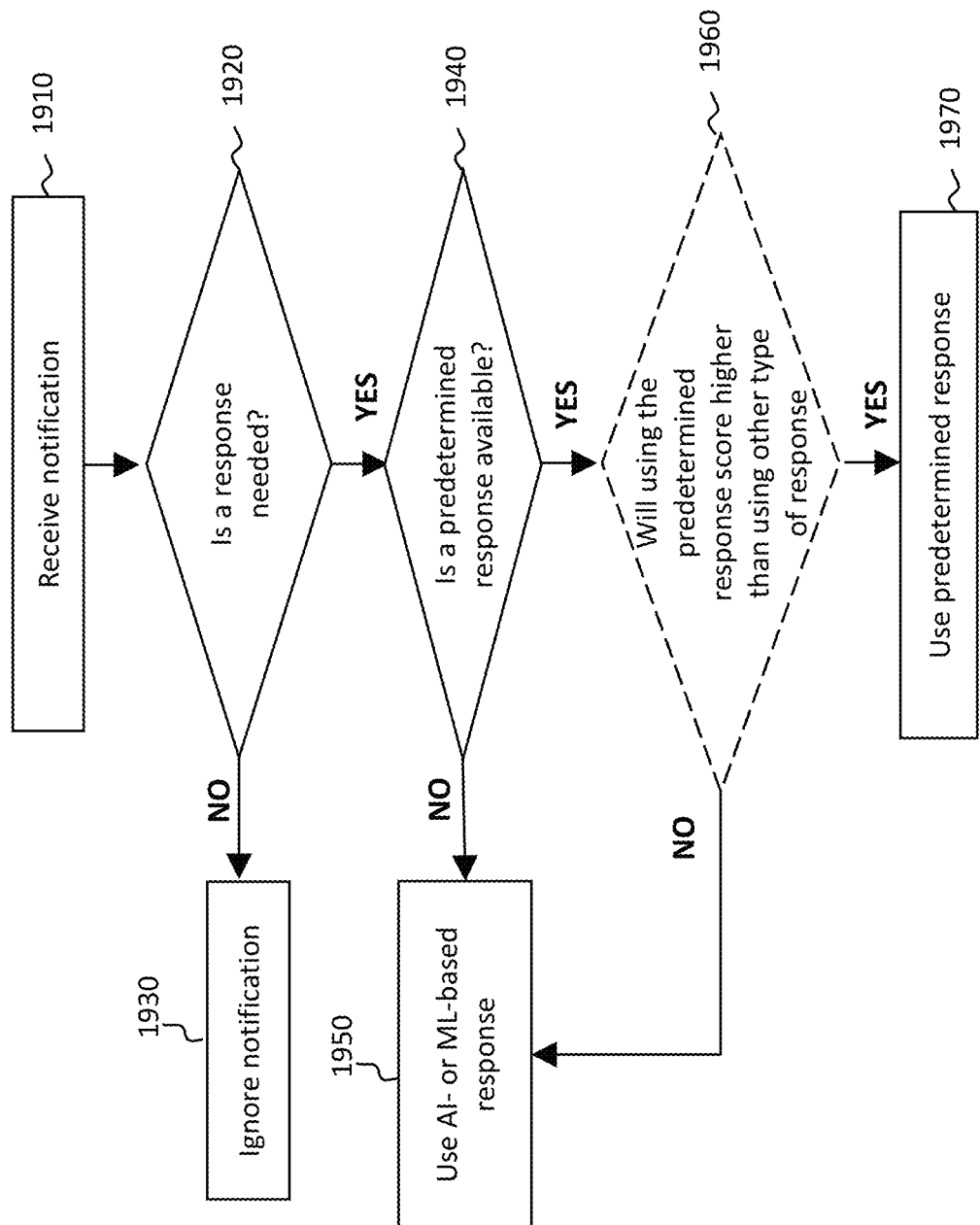
FIG. 19 is a flowchart of a process for whether to use a predetermined or preprogramed response or an AI response based on the probability of the outcome, in accordance with some embodiments of the disclosure.

FIG. 19 is a flowchart of a process for whether to use a predetermined, or preprogrammed, response or an AI response based on the probability of the outcome, in accordance with some embodiments of the disclosure. In this embodiment, the control circuitry may analyze which type of response, such as AI-based, ML-based, or preprogrammed response may result in a better outcome. For example, the control circuitry may analyze which type of response may result in a higher score in a game. Although this flowchart is discussed in a game setting, the flowchart may be applied to any virtual or metaverse setting.

In one embodiment, at block 1910, and notification may be received by the XR device. The control circuitry, upon receiving the notification, may determine at block 1920 whether a response is needed. If a determination is made that the response is not needed, then, at block 1930, the notification may be ignored.

If a determination is made that response is needed, then, at block 1940, the control circuitry may determine whether a predetermined response is available. If a predetermined response is available, at block 1960 the control circuitry may determine whether using a predetermined response may score higher than using any other type of response, such as an AI- or ML-based response.

In order to determine whether a predetermined response or and an AI- or ML-based response may have a better outcome, such as a higher score in a game, the control circuitry may perform probability evaluations to determine the outcomes. If a determination is made that a predetermined response might score higher, then, at block 1970, the predetermined response may be used. However, if a determination is made that and an AI- or ML-based response may score higher, then the control circuitry may use that AI- or ML-based response, as depicted at block 1950. In some embodiments, the control circuitry may not perform the steps indicated in block 1960, and upon a determination that a predetermined response is available at block 1940, may proceed to block 1970 and use the predetermined response.

Figure 20:
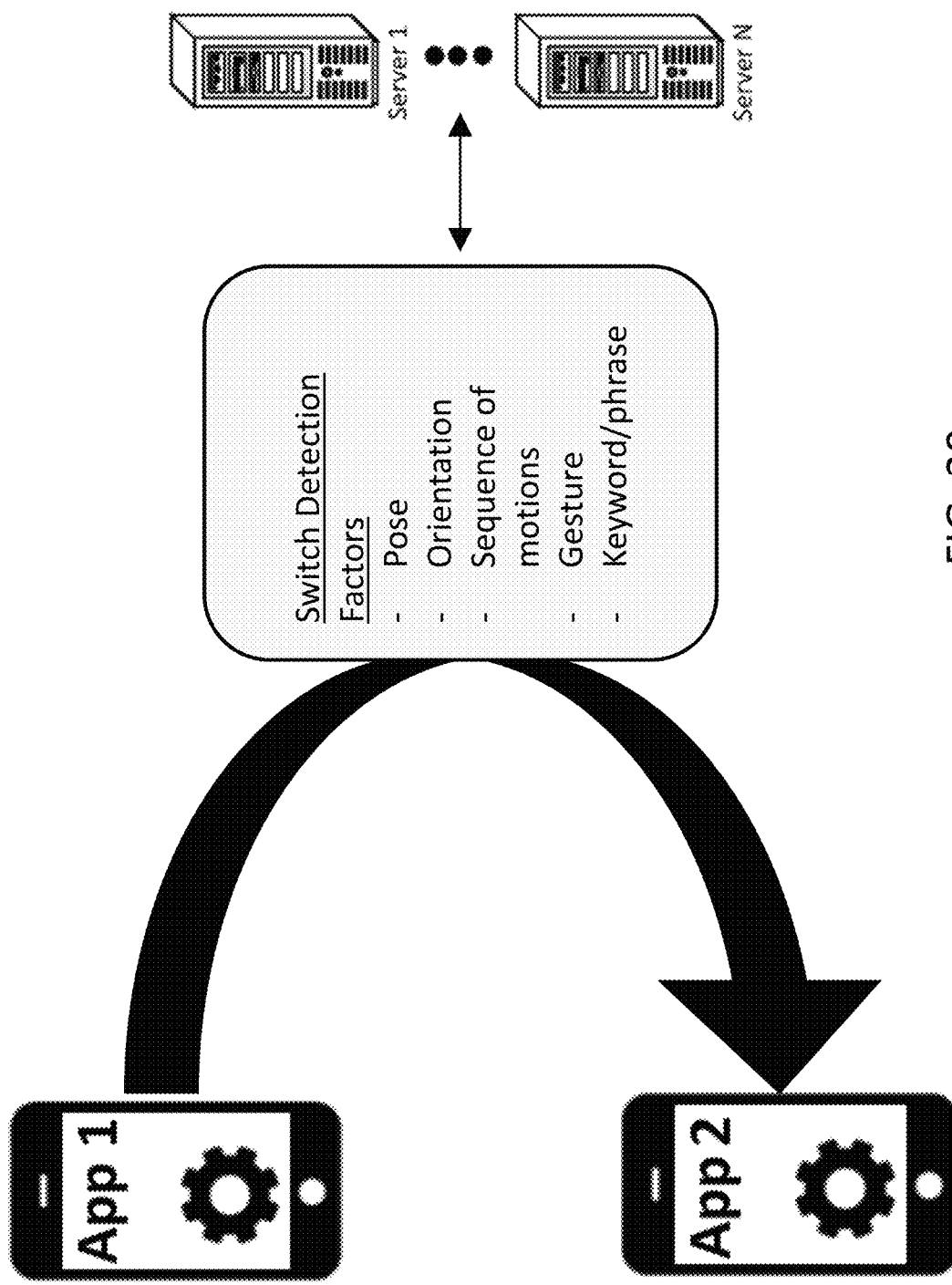
FIG. 20 is block diagram of types of switch detection factors for switching from one XR app to another XR app running concurrently in the metaverse, in accordance with some embodiments of the disclosure.

FIG. 20 is block diagram of types of switch detection factors for switching from one XR app to another XR app running concurrently in the extended reality space, such as the metaverse, in accordance with some embodiments of the disclosure.

In some embodiments, the user may store a particular pose, an orientation, a sequence of motions, gestures, or a combination of keywords or phrases and any of the above to trigger switching active presence from one XR app to another XR app. In other words, physical actions and gestures made by the user may be used as a human remote (similar to a remote control but instead using human gestures and movements) to switch active presence to a particular app from a plurality of apps that are concurrently running on the user's XR device.

In one embodiment, the user may use a particular pose associated with switching to a particular app. For example, a pose with a left leg up and left hand up may indicate a switch to App 2, while a right leg up and right hand up pose may indicate a switch to App 3. Likewise, the user may also use a particular orientation and associate it to an indication to switch to a specific app.

In one embodiment, the user may also use a sequence of motions performed in the real world as an indication to switch to a desired app. Gestures and keywords or phrases or any combination of switch detection factors may also be used.

Figure 21:
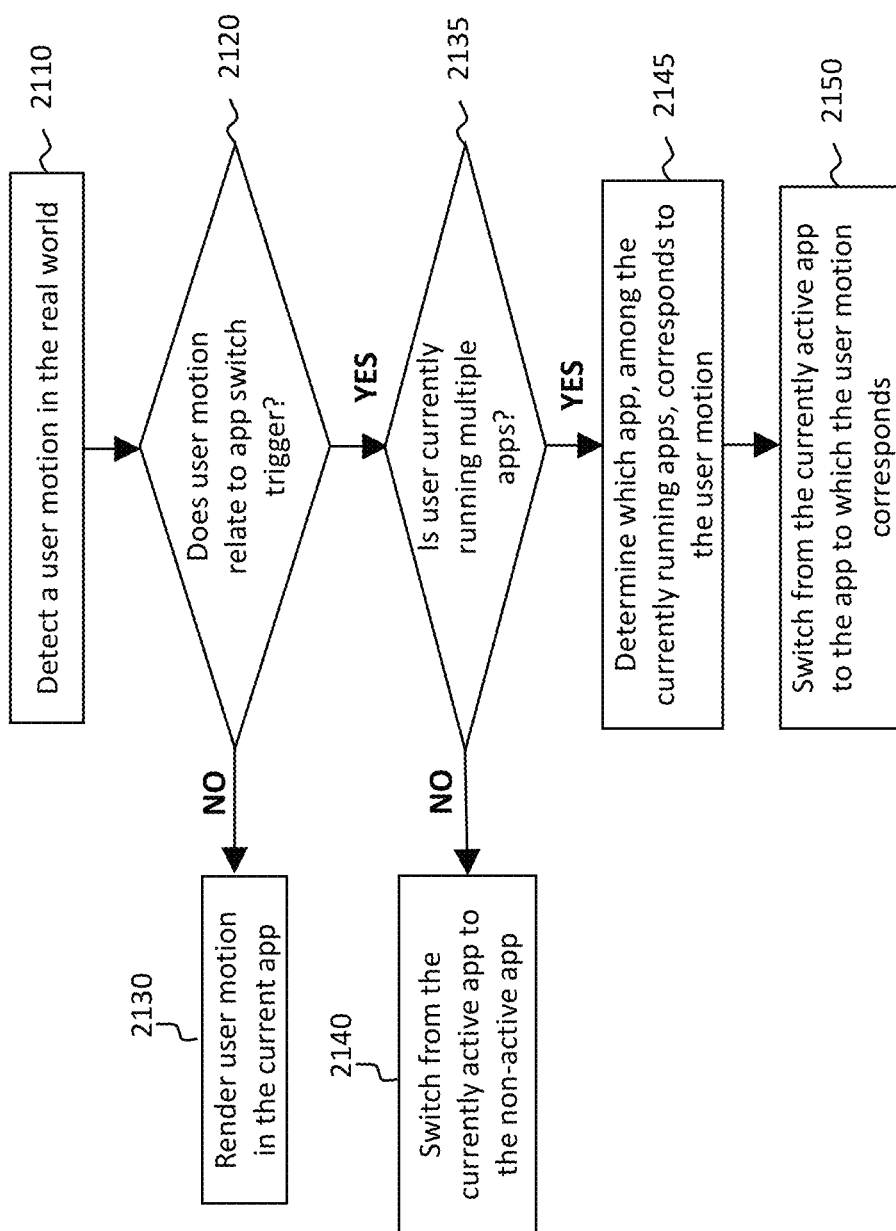
FIG. 21 is a flowchart for a process to distinguish between a switch detection factor and a motion intended for an activity to be performed in a currently running XR app, in accordance with some embodiments of the disclosure.

FIG. 21 is a flowchart for a process to distinguish between a switch detection factor and a motion intended for an activity to be performed in a currently running XR app, in accordance with some embodiments of the disclosure. For example, if a user profile indicates that a sudden turn to the left at a particular angle should be associated with an indication to switch to a different app, the control circuitry may distinguish another action performed in the app, such as while the user is playing a game, such that the action is associated with an indication to switch and not a game play action or vice versa.

To determine whether the action performed in the real world is to be associated with an indication to switch apps or with a game action, the control circuitry may perform the steps indicated in FIG. 21. Accordingly, at block 2110, the control circuitry may detect a physical motion performed by the user in the real world. At block 2110, the control circuitry 220 and/or 228 may determine whether the user motion is an indication to switch an app, i.e., an app switch trigger. The control circuitry may make the determination by comparing the physical motion to a list of stored motions in the user's profile. Since each start motion in the user profile may be associated with a particular app, the control circuitry may try and determine a match between the user motion performed and a user motion listed in the user profile. If a match is made at block 2120, then the control circuitry may determine that the physical motion performed by the user is an indication to switch to a particular app that is matched in the user profile. If a match is not made at block 2110, then, as depicted at block 2130, the control circuitry may associate the physical motion performed with an action that needs to be executed in the current app, such as an action performed by an avatar in a game. Accordingly, at block 2130, the control circuitry may render the user motion in the current app.

At block 2135, the control circuitry may determine whether the XR device is running multiple apps concurrently. If only one additional app, a second app, is concurrently running on the XR device, then, at block 2140, the control circuitry may switch from the current app to the second app running on the XR device. However, if several apps are running concurrently on the XR device, then, at block 2145, the control circuitry may determine which app among the current running apps corresponds to the user motion. Upon determining a match between the motion performed and a specific app, the control circuitry may, at block 2150, automatically switch to the specific app.

Figure 22:
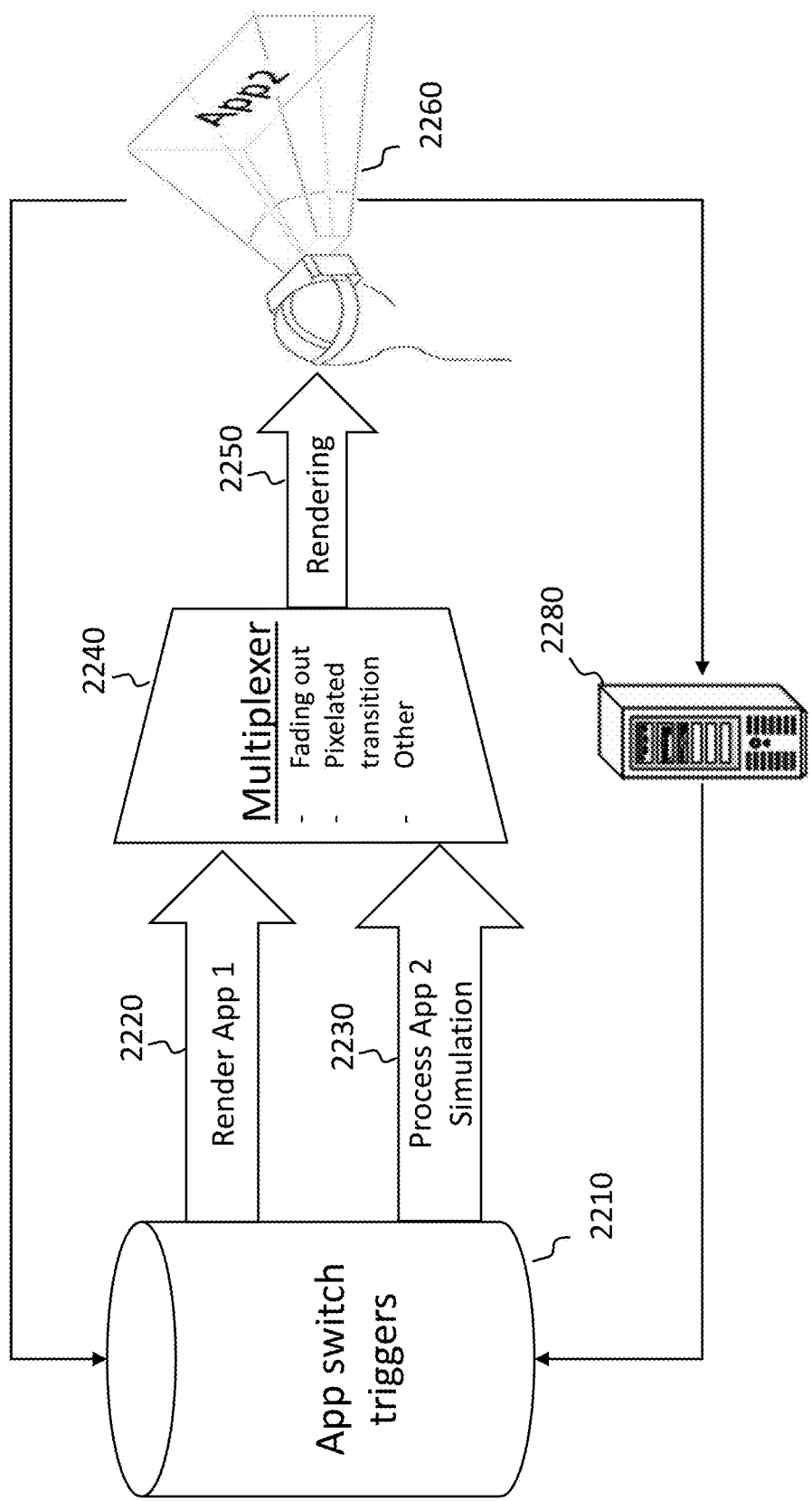
FIG. 22 is an example of a multiplexing and rendering process, in accordance with some embodiments of the disclosure.

FIG. 22 is an example of a multiplexing and rendering process, in accordance with some embodiments of the disclosure. In one environment, once an app switch trigger is received by the control circuitry, the control circuitry may invoke a rendering and a back-end simulation module to perform a rendering and simulation operation.

In one embodiment, the user may currently be present in App 1. The app switch trigger received may indicate a desired switch from App1 to App 2. Accordingly, the control circuitry may send proper instructions to the rendering app to start rendering App 2, stop rendering App 1, and start back-end simulation processing for App 1.

At block 2240, in some embodiments, the multiplexer may perform a fading out operation such that a seamless transition occurs on the display screen of the XR device wherein rendering of App 1 is faded out and transitioned to rendering of App 2. In other embodiments, the multiplexer may perform a pixelated transition instead of a fading out transition from App 1 to App 2.

The rendering of App 2 may then be performed such that App 2 may be displayed on the XR device 2260. The control circuitry, after switching active presence from App 1 to App 2, may provide any notifications from App 1 to the user (not shown in figure) if a relevant event occurs in App 1.

Figure 23:
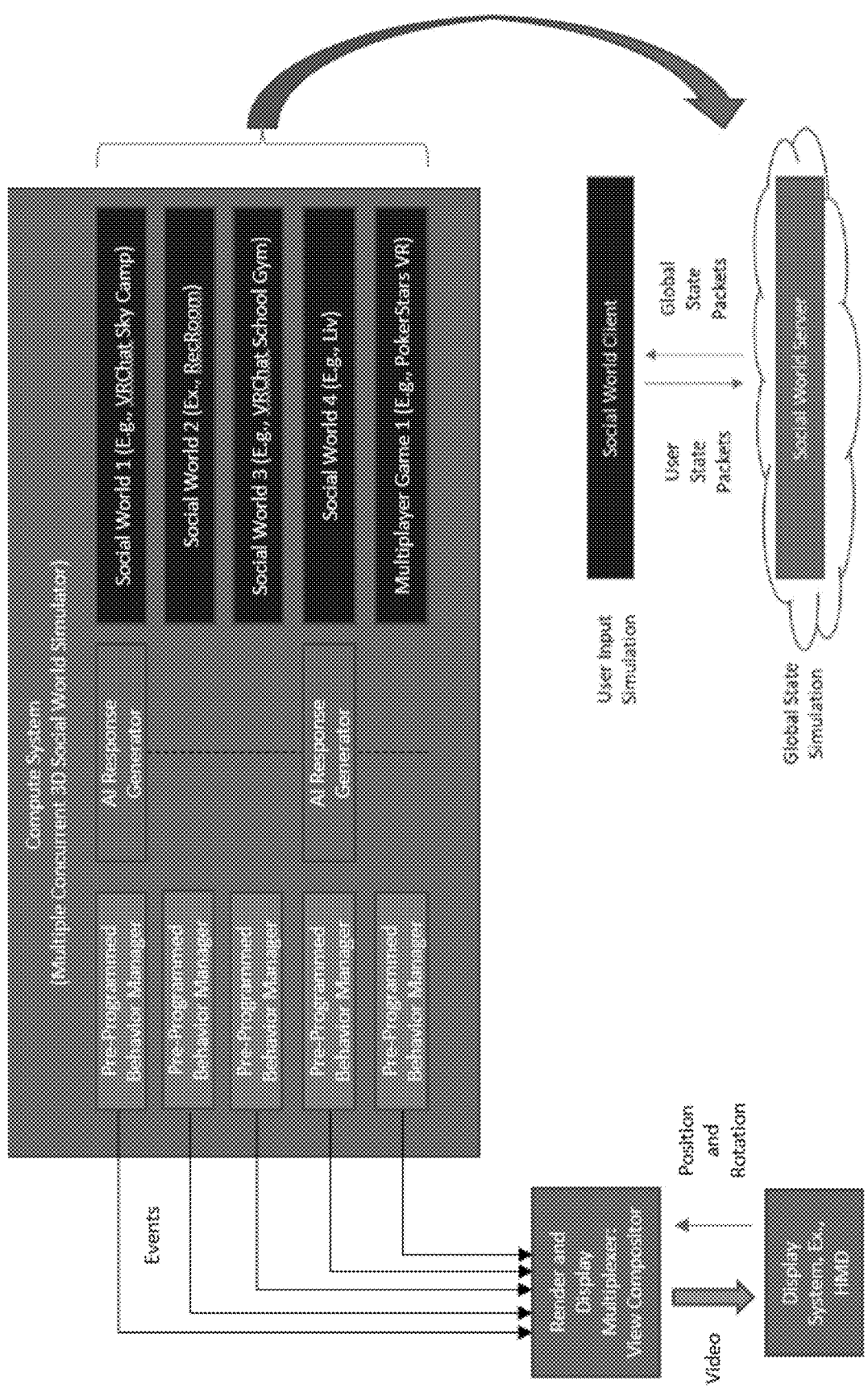
FIG. 23 is an example of a system for concurrently managing active and non-active presence in multiple XR applications, in accordance with some embodiments of the disclosure.

FIG. 23 is an example of a system for concurrently managing active and non-active presence in multiple XR applications, in accordance with some embodiments of the disclosure.

In some embodiments, the system for concurrently managing active and non-active presence in multiple XR applications, which may be referred to as an XR compute-and-render system, includes an XR head-mounted display (HMD) (and controllers with the HMD) and optionally, a computer system, such as a GPU-equipped computer or a GPU-equipped cloud server. The exemplary architecture for the XR compute-and-render system, as depicted in FIG. 23, includes a pre-programmed behavior manager, an AI response generator, and a render and display multiplexer.

In some embodiments, the computer system for multi-location is capable of concurrently running multiple 3D social world or multi-player game client simulations. The control circuitry in the XR compute-and-render system may, for each app that is concurrently running, perform simulations. These simulations may be based on information about the user's state. The control circuitry may inform the server of any changes based on this state information of the user. These may include changes in user voice, HMD position and orientation trajectories, controller position and orientation trajectories, and actuations in a scene.

In some embodiments, each XR app may include its own preprogrammed behavior manager module. Each such manager module may detect relevant events in the XR app and may process the events to provide responses within the XR world, such as auto-responses described in the description related to FIG. 6. Each preprogrammed behavior manager may also contain the ASR and NLU units to infer the intent of a second user that wants to interact with the first user. The preprogrammed behavior manager may also send event notifications for relevant events and generate a summary of the response to the Render and Display Multiplexer.

In some embodiments, the XR compute-and-render system may include an AI response generator. The AI response generator may use an AI engine to generate responses to relevant events that may not have a preprogrammed response behavior. The relevant events and a summary of the response may be sent to the render and display multiplexer.

In some embodiments, a user may deploy a preprogrammed behavior manager with an AI response generator where some events are configured to be handled by the pre-programmed behavior manager while others may default to the AI response generator.

In some embodiments, the XR compute-and-render system may include a render and display multiplexer that performs the following functions: a) composing the event notification triggers and response summaries across the XR apps where the user is inactive into the rendering of the XR app in which the user is currently active, b) sending composited video views to the display system (HMD), c) receiving positional and rotational data from the HMD/controllers and forwarding it to the XR app in which the user is currently active, and d) when receiving a user command to teleport, or move active control, into another XR app based on a relevant event, and multiplexing the bi-directional stream to the XR app. Video may also be sent from the new XR app, and positional and rotational data may be received by this app in which the avatar is being actively controlled by the user.

Figure 24:
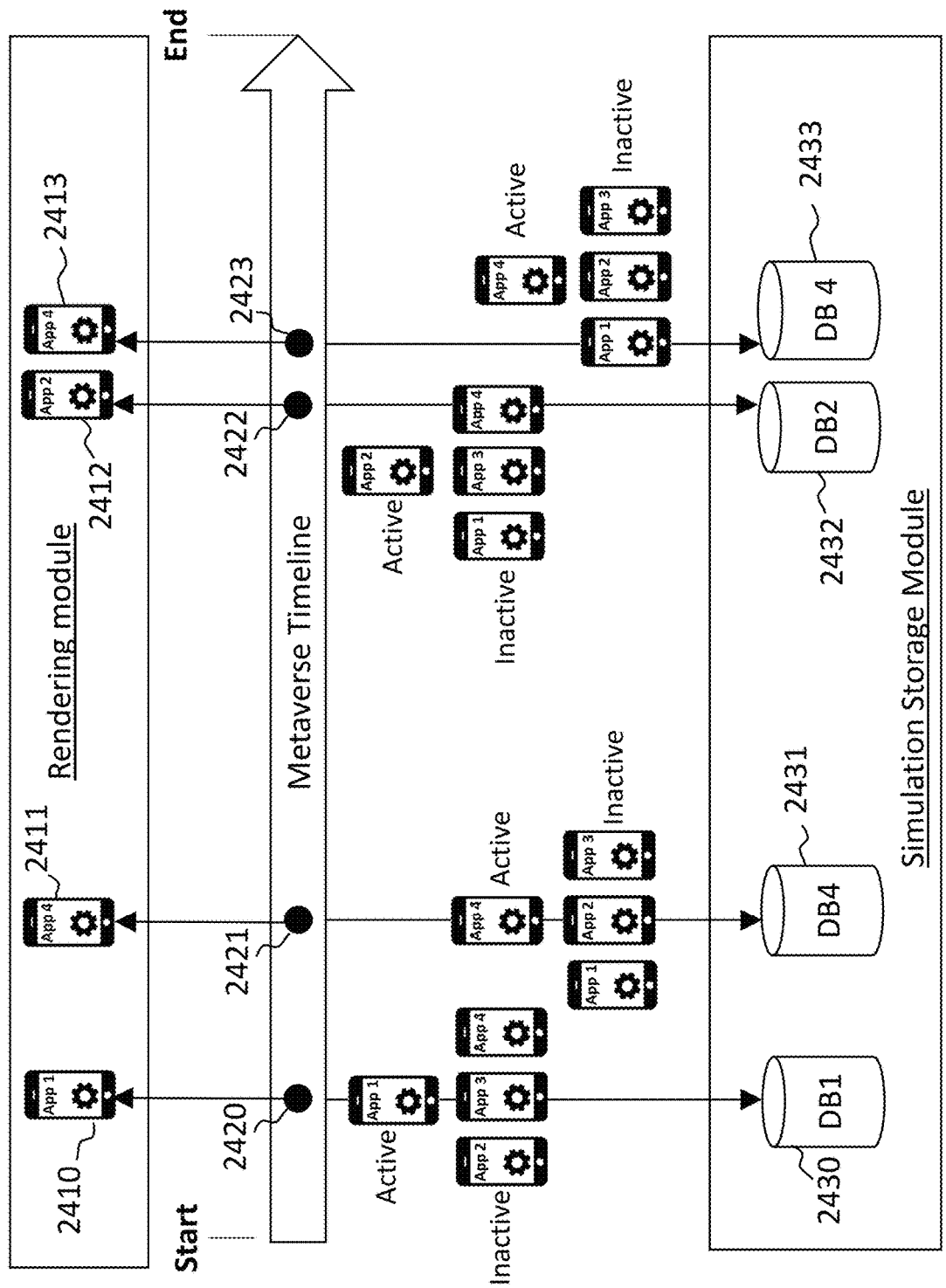
FIG. 24 is a block diagram of processes performed by the system as a user switches between multiple concurrently running XR apps in the metaverse, in accordance with some embodiments of the disclosure.

FIG. 24 is a block diagram of processes performed by the system as a user switches between multiple concurrently running XR apps in the extended reality environment, such as the metaverse, in accordance with some embodiments of the disclosure.

In some embodiments, control circuitry 220 and/or 228 may determine that the user's XR device is concurrently running Apps 1-4 (2410, 2411, 2412, and 2413) and that the user is currently actively present in App 1 2410.

The control circuitry 220 and/or 228 may determine that at a timestamp 2420 in the metaverse timeline, App 1 is being rendered and the remaining of the apps, i.e., Apps 2-4, may be on autopilot where back-end processing of their simulations may be stored in database one, DB1 2430.

At timestamp 2421 in the metaverse timeline, the control circuitry 220 and/or 228 may receive an indication from the user to switch actively being present from App 1 to App 4. As such, the control circuitry 220 and/or 228 may render App 4, stop rendering App 1, and store simulations related to Apps 1-3 in database four, DB4 2431. The control circuitry 220 and/or 228 may continue switching between rendering and performing back-end simulation processing as the user continues to switch their presence from one app to another app.

Figure 25:
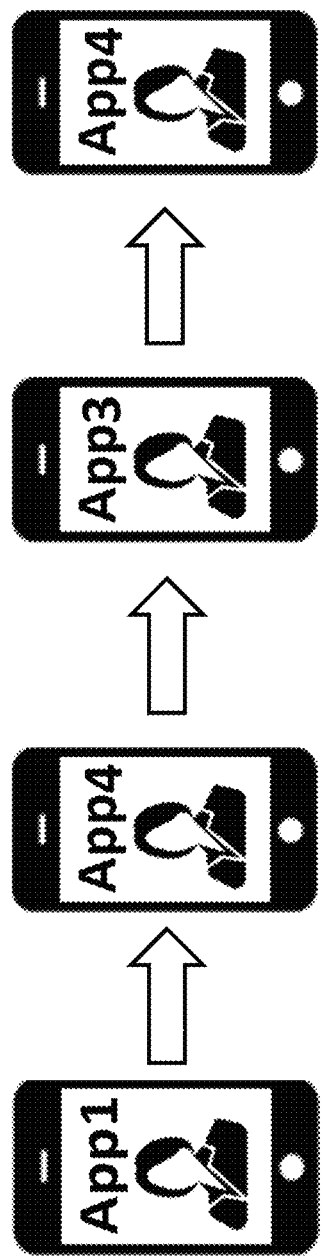
FIG. 25 is block diagram of an example of switching between multiple concurrently running XR apps in the metaverse, in accordance with some embodiments of the disclosure.

FIG. 25 is block diagram of an example of switching between multiple concurrently running XR apps in the extended reality environment, such as the metaverse, in accordance with some embodiments of the disclosure. In this embodiment, the user switches from App 1 to App 4, then switches from App 4 to App 3, and then switches back to App 4. The processes performed when such switching occurs are described in connection with FIG. 26. For example, when the user indicates a switch from being actively present in App 1 to being actively present in App 4, the control circuitry renders App 4 and changes the status of Apps 1-3 to autopilot, or inactive presence status. Accordingly, the control circuitry performs an action of removing an avatar from App 4 and replacing it with the user. It may also allow the user to take active control of the existing avatar and remove it from autopilot. The control circuitry may also replace the user in App 1 with an avatar or remove manual control of the avatar in App 1 and put the avatar on autopilot.

FIG. 26 is a detailed description of processes and actions performed when switching between multiple concurrently running XR apps in the metaverse, in accordance with some embodiments of the disclosure. FIG. 16 describes the processes and actions taken by the control circuitry as the user switches from active to inactive and then inactive to active from one XR app to another. For example, as depicted in row 1 of the table in FIG. 26, the user is currently active in App1 and inactive in Apps 2-4. As such, the processes and actions performed by control circuitry are depicted in column (processes and actions) where avatars are automated in Apps 2-4. As it can be seen, whenever the user is not active in an app, the avatar is automated and when the user switches to being active, then the automated mode is removed thereby allowing the user to perform user driven manual actions and maneuvers in the active app.

Figure 27:
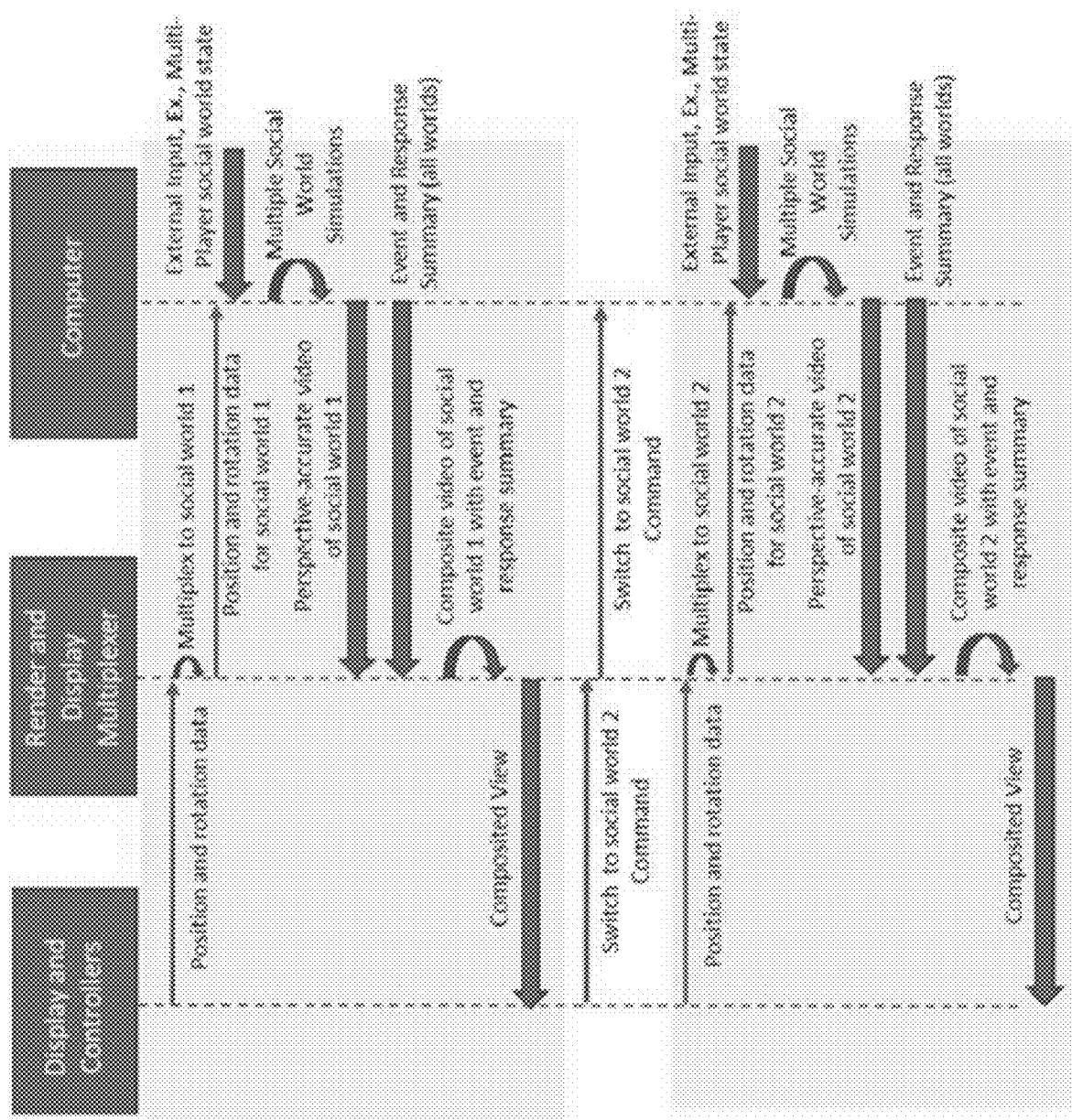
FIG. 27 is an example of communications between components of a system to manage rendering, switching, and active and non-active presence in XR applications, in accordance with some embodiments of the disclosure.

FIG. 27 is an example of message sequence between components of a system to manage rendering, switching, and active and non-active presence in XR applications, in accordance with some embodiments of the disclosure.

In some embodiments, the messages in the message sequence occur at the system frame rate, except for the switch command, which occurs on user demand. The event notification and response summary may be empty unless a relevant query or event in any of the XR apps is detected by the control circuitry.

The message sequence is an example of communications between the display and controllers, the render and display multiplexer, and the computer system. For example, positional and rotational data may be exchanged between the components to accurately render an app when a user is actively present in the app.

FIG. 28 comprises examples of scenarios for allowing or preventing transition from one XR app to another XR App based on safety reasons, in accordance with some embodiments of the disclosure.

In some embodiments, when an indication to switch from one app to another app is received by the control circuitry, the control circuitry may invoke a safety module to run a safety process prior to allowing the switch to the new app. The safety process may ensure that switching to the new app does not cause any safety concerns for the current user. Some examples of what may cause a safety concern are described in FIG. 28.

In some embodiments, as described at 2810, a user may indicate a desire to switch from their current app, which is App 1, to App 2. The safety module may perform a safety process to determine whether switching from App 1 to App 2 is safe and should be allowed. The safety assessment resulting from the safety process may indicate that switching from App 1, which may be an augmented reality (AR) app, to App 2 at the current time will require the user to walk seven steps forward, resulting in the user colliding with a wall. This may be the case because in App 2, the game may require the user to move forward by seven steps to perform an action. Since allowing the transition may harm the user's safety, the safety module may prevent the transition between the apps or provide a suggestion to the user not to transition at the present time. The user may have the option to override the recommendation if they prefer.

In another embodiment, as described at 2820, a user may indicate a desire to switch from their current app, which is App 1, to App 4. The safety module may perform a safety process to determine whether switching from App 1 to App 4 is safe and should be allowed. The safety assessment resulting from the safety process may indicate that switching from App 1 to App 4 at the current time may result in the user coming in direct contact with a family member walking by. Since the user may be in an AR mode, which allows the user to see through their headset or smart glasses to perceive the real world, the user may see the family member walking by and be able to avoid contact with them. As such, the transition from App 1 to App 4 may be determined to be safe and may be allowed.

In another embodiment, as depicted at 2830, a user may indicate a desire to switch from their current app, which is App 3, to App 1. The safety module may perform a safety process to determine whether switching from App 3 to App 1 is safe and should be allowed. The safety assessment resulting from the safety process may indicate that switching from App 3 to App 1 at the current time may result in the user walking into their bed. As such, the recommendation may be to not provide the transition. However, in this embodiment, the user may have selected to override the recommendation, and as such, the transition may be allowed based on the overriding.

Figure 29:
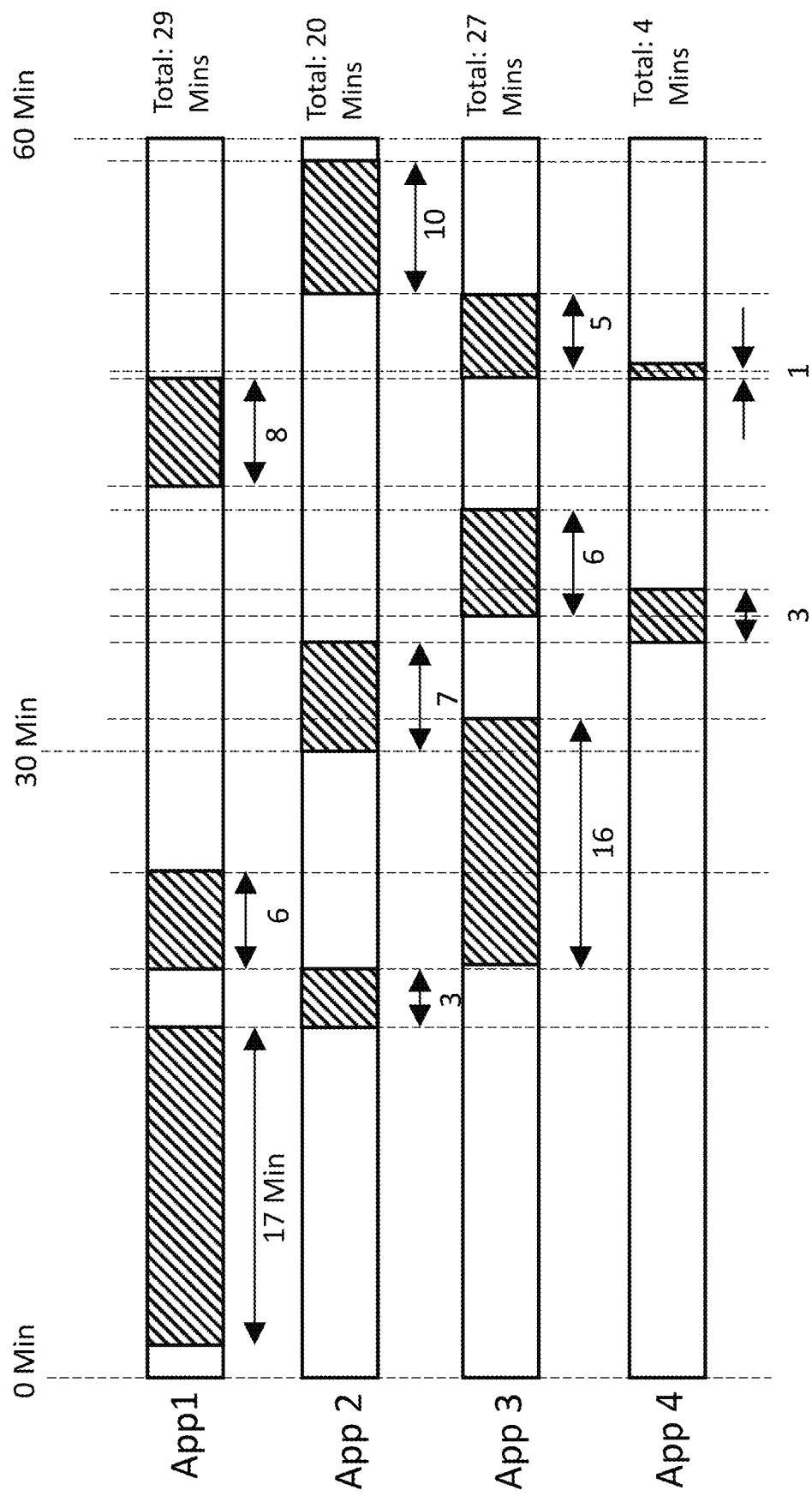
FIG. 29 is a timeline of time spent by a user in each XR app concurrently running in the metaverse that may be used for pattern detection, in accordance with some embodiments of the disclosure.

FIG. 29 is a timeline of time spent by a user in each XR app concurrently running in the metaverse that may be used for pattern detection, in accordance with some embodiments of the disclosure. In some embodiments, the control circuitry may monitor and keep an account of the amount of minutes spent by the user being actively present in the concurrently running apps. As depicted, in one embodiment, a determination may be made that the user has spent 29 minutes of being actively present in App 1, 20 minutes of being actively present in App 2, 27 minutes of being actively present in App 3, and 4 minutes of being actively present in App 4. Since all four apps may have been concurrently running for the entire duration of 60 minutes, the avatars in the apps when the user was not actively present may be automated to provide a response when a relevant situation, query or event occurs in those apps. The amount of time spent actively being present and the amount of time for the avatars to be on auto-response are also depicted in table in FIG. 30. Using this data, the control circuitry may determine outcomes that occurred based on the active and inactive presence as well as based on the type of auto-response provided.

In one embodiment, as depicted in FIG. 30, all the apps may be running a type of game that allows the user opportunities to score points. Although a game is used as an example, the processes of FIGS. 29 and 30 may be applied to any other virtual or metaverse environment. As depicted in FIG. 30, the user may have spent 29 minutes of being actively present in App 1, i.e., the avatar in App 1 was on auto-response for the remainder of the time, 31 minutes of the 60 minutes total time the app was running.

In some embodiments, data from FIGS. 29 and 30 may be used by the control circuitry to detect a pattern. For example, if a user continuously switches between apps 2 and 3 and the switches are related to notifications from the apps, the control circuitry may be able to determine that certain types of notifications are more important to the user than others and the user typically follows up on those notifications by switching into being actively present in the other app. For example, the user may typically switch back into an app when he receives a notification that his boss or a certain colleague is speaking. It may also be the case that the user typically switches back into an app when a game level is completed. Other situations and circumstances in which a user acts upon the notification to jump back into being physically present in an app may also be analyzed and used to detect patterns.

Once a pattern is detected, the control circuitry may use the pattern information to plan resources or anticipate actions that are to be performed by the user. The control circuitry may also determine that type of response the user provides as a pattern and use such data to further train the AI algorithm such that it can use the user's given responses via avatars to answer queries in apps.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting first and second extended reality (XR) applications running concurrently in an extended reality environment;
   associating a first avatar with the first XR application and a second avatar with the second XR application, wherein the first avatar and second avatar correspond to a same user;
   receiving an indication of active user participation via the first avatar in the first XR application; and
   based at least in part on the received indication, automating a response by the second avatar in the second XR application such that the second avatar participates in the second XR application without active input by the user.

2. The method of claim 1, wherein the automating of the response by the second avatar in the second XR application is performed in response to receiving a notification of an activity directed at the second avatar in the second XR application.

3. The method of claim 1, wherein the active participation of the first avatar in the first XR application is determined based on a gaze of the user towards the first XR application, wherein the gaze of the user is determined by an inward facing camera of a virtual reality headset worn by the user while interacting with the first XR application.

4. The method of claim 1, wherein automating a response by the second avatar in the second XR application further comprises automatically executing the response based on a trained artificial intelligence (AI) algorithm, wherein the AI algorithm is trained to respond to an activity in the second XR application that is directed towards the second avatar.

5. The method of claim 1, wherein automating the second avatar in the second XR application further comprises:
   configuring the second avatar to perform a predetermined response based on a type of activity directed at the second avatar; and
   automatically performing the predetermined response if the type of activity directed at the second avatar is related to a category of the predetermined response.

6. The method of claim 5, wherein the predetermined response is a verbal response by the second avatar to a query directed at the second avatar.

7. The method of claim 1, further comprising, notifying the user of activity directed at the second avatar in the second XR application when the user is currently active in the first XR application.

8. The method of claim 7, wherein the notification includes a summary of an activity directed at the second avatar in the second XR application.

9. The method of claim 7, further comprising, providing an option to the user to switch from actively participating in the first XR application to actively participating in the second XR application.

10. The method of claim 9, further comprising, in response to the user switching from the first XR application to the second XR application, automating the first avatar in the first XR application such that the first avatar participates in first XR application without active input by the user.

11. The method of claim 1, further comprising:
determining whether an activity directed at the second avatar in the second XR application is relevant to the user while the user is active in the first XR application; and
transmitting a notification to a display of an extended reality device when a determination is made that the activity is relevant.

12. The method of claim 1, further comprising:
receiving a notification during active participation of the first avatar in the first XR application;
determining that the notification requires an action that is unrelated to being actively present in the first XR application; and
in response to the determination, masking the action that is unrelated to being actively present in the first XR application, wherein such masking makes it appear that the first avatar is still actively participating in the first XR application.

13. The method of claim 12, wherein the action that is unrelated to being actively present in the first XR application is gazing at the notification.

14. The method of claim 12, wherein the action that is unrelated to being actively present in the first XR application is performing an action in the second XR application.

15. The method of claim 12, further comprising:
determining that at the time of receiving the notification, gaze is directed towards a first location in the first XR application; and
determining that the notification requires the gaze to be directed to a second location in the first XR application; and
in response to the determination, performing a masking operation that makes the gaze appear as if it is directed towards the first location even though the gaze may be switched to the second location.

16. The method of claim 1, further comprising:
automating the response by the second avatar in the second XR application, based at least in part on determining that the user is not actively participating in the second XR application.

17. A system comprising:
communications circuitry configured to access first and second extended reality (XR) applications; and
control circuitry configured to:
detect the first and the second extended reality (XR) applications running concurrently in an extended reality environment;
associate a first avatar with the first XR application and a second avatar with the second XR application, wherein the first avatar and second avatar correspond to a user;
receive an indication of active user participation via the first avatar in the first XR application; and
based at least in part on the received indication, automate a response by the second avatar in the second XR application such that the second avatar participates in the second XR application without active input by the user.

18. The system of claim 17, wherein the automating of the response by the second avatar in the second XR application is performed by the control circuitry in response to receiving a notification of an activity directed at the second avatar in the second XR application.

19. The system of claim 17, wherein the active participation of the first avatar in the first XR application is determined by the control circuitry based on a gaze of the user towards the first XR application, wherein the gaze of the user is determined by an inward facing camera of a virtual reality headset worn by the user while interacting with the first XR application.

20. The system of claim 17, wherein automating the second avatar in the second XR application further comprises, the control circuitry configured to:
configure the second avatar to perform a predetermined response based on a type of activity directed at the second avatar; and
automatically perform the predetermined response if the type of activity directed at the second avatar is related to a category of the predetermined response.

21. The system of claim 20, wherein the predetermined response is a verbal response by the second avatar to a query directed at the second avatar.

22. The system of claim 17, further comprising, the control circuitry configured to notify the user of activity directed at the second avatar in the second XR application when the user is currently active in the first XR application.

23. The system of claim 17, further comprising, the control circuitry configured to:
determine whether an activity directed at the second avatar in the second XR application is relevant to the user while the user is active in the first XR application; and
transmit a notification to a display of an extended reality device when a determination is made that the activity is relevant.

24. The system of claim 17, wherein the control circuitry is further configured to:
automate the response by the second avatar in the second XR application, based at least in part on determining that the user is not actively participating in the second XR application.

* * * * *